(12) United States Patent
Xiang et al.

(10) Patent No.: US 11,902,185 B2
(45) Date of Patent: Feb. 13, 2024

(54) SIDELINK INFORMATION TRANSMISSION METHOD, COMMUNICATIONS DEVICE, AND NETWORK DEVICE

(71) Applicant: Huawei Technologies Co., Ltd., Shenzhen (CN)

(72) Inventors: Zhengzheng Xiang, Shanghai (CN); Jinfang Zhang, Shenzhen (CN); Hongjia Su, Shanghai (CN); Lei Lu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 481 days.

(21) Appl. No.: 17/205,644

(22) Filed: Mar. 18, 2021

(65) Prior Publication Data
US 2021/0211246 A1   Jul. 8, 2021

Related U.S. Application Data

(63) Continuation of application No. PCT/CN2019/105977, filed on Sep. 16, 2019.

(30) Foreign Application Priority Data

Sep. 19, 2018 (CN) .......................... 201811094022.3

(51) Int. Cl.
*H04L 5/00* (2006.01)
*H04W 76/14* (2018.01)
(Continued)

(52) U.S. Cl.
CPC .......... *H04L 5/0005* (2013.01); *H04L 5/0091* (2013.01); *H04W 72/0446* (2013.01); *H04W 72/0453* (2013.01); *H04W 76/14* (2018.02)

(58) Field of Classification Search
CPC ... H04L 5/0005; H04L 5/0091; H04L 5/0044; H04L 5/0053; H04L 5/0094;
(Continued)

(56) References Cited

U.S. PATENT DOCUMENTS

| 11,509,433 B2 | 1/2022 | Kimura et al. | |
| 2015/0208384 A1* | 7/2015 | Baghel | H04W 72/04 455/450 |

(Continued)

FOREIGN PATENT DOCUMENTS

| CN | 105451211 A | 3/2016 |
| CN | 106063352 A | 10/2016 |

(Continued)

OTHER PUBLICATIONS

"Discussion on NR Sidelink Physical Resource Pool Allocation," Source: ZTE, Agenda Item: 7.2.4.1.4, Document for: Discussion, 3GPP TSG RAN WG1 Meeting #94, R1-1808605, Gothenburg, Sweden, Aug. 20-24, 2018, 7 pages.

(Continued)

*Primary Examiner* — Hardikkumar D Patel
(74) *Attorney, Agent, or Firm* — SLATER MATSIL, LLP

(57) ABSTRACT

A sidelink information transmission method, a communications device, and a network device, the method including sending, by a network device, first indication information to a device, the first indication information indicating a first resource that is a resource set used to transmit sidelink information, where the first indication information is used to obtain a correspondence satisfied by a time-domain resource and a frequency-domain resource of a resource that is in the first resource and that is used to transmit the sidelink control information, and sending, to the device, control information indicating a second resource belonging to the first resource, and having a third resource used to send the sidelink control (Continued)

information to a second communications device and satisfying the correspondence, and having a fourth resource used by the device to send the sidelink data to a second device based on the sidelink control information.

18 Claims, 8 Drawing Sheets

(51) Int. Cl.
*H04W 72/0446* (2023.01)
*H04W 72/0453* (2023.01)

(58) Field of Classification Search
CPC ......... H04W 72/0446; H04W 72/0453; H04W 76/14; H04W 72/20; H04W 92/18
See application file for complete search history.

(56) References Cited

U.S. PATENT DOCUMENTS

| | | | |
|---|---|---|---|
| 2016/0128115 | A1 | 5/2016 | Panteleev et al. |
| 2016/0381666 | A1 | 12/2016 | Kim et al. |
| 2017/0150538 | A1 | 5/2017 | Wei |
| 2019/0239203 | A1 | 8/2019 | Chae |
| 2019/0387377 | A1* | 12/2019 | Zhang ................ H04W 52/383 |

FOREIGN PATENT DOCUMENTS

| | | | |
|---|---|---|---|
| CN | 106470492 | A | 3/2017 |
| CN | 107005997 | A | 8/2017 |
| CN | 107736061 | A | 2/2018 |
| CN | 107889222 | A | 4/2018 |
| JP | 2018029323 | A | 2/2018 |
| WO | 2018094872 | A1 | 5/2008 |
| WO | 2017171390 | A1 | 10/2017 |
| WO | 2018038525 | A1 | 3/2018 |
| WO | 2018151637 | A1 | 8/2018 |

OTHER PUBLICATIONS

Mediatek Inc., "On NR V2X Resource Allocation", R1-1808281, 3GPP TSG RAN WG1 Meeting #94, Gothenburg, Sweden, Aug. 20-24, 2018, 4 pages.
"3rd Generation Partnership Project; Technical Specification Group Radio Access Network; Evolved Universal Terrestrial Radio Access (E-UTRA); Multiplexing and channel coding (Release 15)," 3GPP TS 36.212 V15.2.0, Jun. 2018, 238 pages.
"3rd Generation Partnership Project; Technical Specification Group Radio Access Network; NR; Multiplexing and channel coding (Release 15)," 3GPP TS 38.212 V15.2.0, Jun. 2018, 94 pages.
"3rd Generation Partnership Project; Technical Specification Group Radio Access Network; NR; Physical Layer Procedures for Control (Release 15)," 3GPP TS 38.213 V15.2.0, Jun. 2018, 98 pages.
"3rd Generation Partnership Project; Technical Specification Group Radio Access Network; NR; Physical layer procedures for data (Release 15)," 3GPP TS 38.214 V15.2.0, Jun. 2018, 95 pages.
"3rd Generation Partnership Project; Technical Specification Group Radio Access Network; NR; Radio Resource Control (RRC) protocol specification (Release 15)," 3GPP TS 38.331 V15.2.1, Jun. 2018, 303 pages.
"Contents of Downlink Control Information for V2V over PC5," Source: Ericsson, Agenda Item: 7.2.2.4.1, Document for: Discussion and Decision, 3GPP TSG RAN WG1 Meeting #86, R1-166957, Gothenburg, Sweden, Aug. 22-26, 2016, 3 pages.
"Discussion on Sidelink Physical Layer Structures and Procedures," Agenda Item: 7.2.4.1.2, Source: LG Electronics, Document for: Discussion and Decision, 3GPP TSG RAN WG1 Meeting #94, Gothenburg, Sweden, Aug. 20-24, 2018, 9 pages.
"Discussion on Physical Layer Structures and Procedures for NR V2X," Agenda item: 7.2.4.1.2,Source: Samsung, Document for: Discussion and Decision, 3GPP TSG RAN WG1 #94, R1-1808776, Gothenburg, Sweden, August 20-24, 2018, 8 pages.
Mili, M.R. et al., "The Effect of Different Levels of Side Information on the Ergodic Capacity in Cognitive Radio Networks," Globecom 2014—Cognitive Radio and Networks Symposium, 2014, 6 pages.
Yibin, Z., "Research on the Interference Coordination Schemes of D2D Communation System," Information Technology Series, 2017, 72 pages (with English Abstract).

* cited by examiner (a)

(b)

SIDELINK INFORMATION TRANSMISSION METHOD, COMMUNICATIONS DEVICE, AND NETWORK DEVICE

CROSS-REFERENCE TO RELATED APPLICATIONS

This application is a continuation of International Application No. PCT/CN2019/105977, filed on Sep. 16, 2019, which claims priority to Chinese Patent Application No. 201811094022.3, filed on Sep. 19, 2018. The disclosures of the aforementioned applications are hereby incorporated by reference in their entireties.

TECHNICAL FIELD

Embodiments of this application relate to a communications system, and in particular, to a sidelink information transmission method, a communications device, and a network device.

BACKGROUND

Device-to-device (D2D) communication, vehicle-to-vehicle (V2V) communication, vehicle-to-pedestrian (V2P) communication, or vehicle-to-infrastructure/network (V2I/N) communication is a technology for direct communication between terminal devices (terminal device). Direct transmission between terminal devices is defined as sidelink (SL) transmission, and V2V, V2P, and V2I/N are collectively referred to as V2X, which means that a vehicle communicates with everything.

V2X communication is used as an example. A terminal device may perform control information and data communication with another terminal device. In existing V2X communication, sizes of both a time-domain resource and a frequency-domain resource that are used for sidelink control information transmission are fixed, and a time-frequency resource used for sidelink control information transmission cannot be flexibly configured.

SUMMARY

Embodiments of this application provide a sidelink information transmission method, a communications device, a network device, and a communications system, to flexibly configure a time-frequency resource used to transmit sidelink control information.

According to a first aspect, a sidelink information transmission method is provided. The method may be performed by a network device or a chip of a network device, and includes The network device sends first indication information to a first communications device, where the first indication information indicates a first resource, the first resource is a resource set used to transmit sidelink information, and the sidelink information includes sidelink control information and sidelink data, the first resource includes at least one time unit in time domain and at least one subchannel in frequency domain, the time unit includes at least one symbol, and the subchannel includes at least one resource block, and the first indication information is further used to obtain a first correspondence satisfied by a time-domain resource and a frequency-domain resource of a resource that is in the first resource and that is used to transmit the sidelink control information. The network device sends first control information to the first communications device, where the first control information indicates a second resource, the second resource belongs to the first resource, and the second resource includes a third resource and a fourth resource, the third resource is used by the first communications device to send the sidelink control information to a second communications device, the third resource includes at least one symbol in time domain and at least one resource block in frequency domain, and the third resource satisfies the first correspondence, and the fourth resource is used by the first communications device to send the sidelink data to the second communications device based on the sidelink control information.

According to this embodiment of this application, the network device configures the first resource for the first communications device, and flexibly configures the third resource and the fourth resource on the second resource of the first resource based on the first correspondence, so as to flexibly configure time-domain resources and frequency-domain resources used to transmit the sidelink control information and the sidelink data.

In a possible design, the first correspondence belongs to a first relationship table, the first indication information includes the first relationship table or the first relationship table is a predefined relationship table, and the first relationship table includes at least one correspondence between a quantity of symbols occupied by the third resource in time domain and a quantity of resource blocks occupied by the third resource in frequency domain. In this way, the first correspondence may be determined in a plurality of correspondences in the first relationship table, thereby further improving flexibility of configuring the resource for sidelink control information transmission.

In a possible design, the quantity of the resource blocks occupied by the third resource in frequency domain is the same as a quantity of resource blocks included in the subchannel, and the third resource is located on a subchannel with a smallest sequence number in at least one subchannel occupied by the second resource in frequency domain. Because the quantity of the resource blocks occupied by the third resource in frequency domain is the same as the quantity of the resource blocks included in the subchannel, compatibility of sidelink control information configuration is improved.

In a possible design, the first indication information includes at least one of the quantity of the symbols occupied by the third resource in time domain and the quantity of the resource blocks occupied by the third resource in frequency domain. Therefore, the first correspondence may be determined based on the first relationship table and the quantity of the symbols occupied by the third resource in time domain or the quantity of the resource blocks occupied by the third resource in frequency domain. Alternatively, the first correspondence may be determined based on the quantity of the symbols occupied by the third resource in time domain and the quantity of the resource blocks occupied by the third resource in frequency domain. Alternatively, the first correspondence may be determined based on the quantity of the symbols occupied by the third resource in time domain and the quantity of the resource blocks included in the subchannel. Therefore, the third resource is configured in the second resource.

In a possible design, the third resource includes m control channel elements, m is an integer greater than or equal to 1, and the control channel element includes at least one symbol in time domain and at least one resource block or subcarrier in frequency domain.

In a possible design, the first indication information further indicates at least one of the quantity m of the control channel elements included in the third resource, a quantity of symbols included in the control channel element in time domain, and a quantity of resource blocks or subcarriers included in the control channel element in frequency domain, or at least one of the quantity m of the control channel elements included in the third resource, a quantity of symbols included in the control channel element in time domain, and a quantity of resource blocks or subcarriers included in the control channel element in frequency domain is predefined information. Therefore, the quantity m of the control channel elements included in the third resource, the quantity of the symbols included in the control channel element in time domain, and the quantity of the resource blocks or the subcarriers included in the control channel element in frequency domain may be determined.

In a possible design, the m control channel elements included in the third resource are mapped, in a time-domain-first or frequency-domain-first manner, to the subchannel with the smallest sequence number included in the second resource. The sidelink control information is arranged in the time-domain-first manner, that is, in ascending order of time-domain symbols, to fully occupy a symbol and then occupy a next symbol, to arrange the control channel element included in the sidelink information. Alternatively, the sidelink control information is arranged in the frequency-domain-first manner, that is, in ascending order of frequency-domain resource sequence numbers, to fully occupy a resource block and then occupy a next resource block, to arrange the control channel element included in the sidelink information. Therefore, flexibility of configuring the sidelink control information can be further improved.

According to a second aspect, a sidelink information transmission method is provided. The method may be performed by a first communications device or a chip of a first communications device, and includes The first communications device sends, on a third resource, sidelink control information to a second communications device, where the third resource includes at least one symbol in time domain and at least one resource block in frequency domain. The first communications device sends, on a fourth resource, sidelink data to the second communications device based on the sidelink control information, where the fourth resource includes at least one symbol in time domain and at least one resource block in frequency domain.

According to this embodiment of this application, the first communications device respectively sends the sidelink control information and the sidelink data to the second communications device on the third resource and the fourth resource that are flexibly configured.

In a possible design, the first communications device receives first indication information from a network device, where the first indication information indicates a first resource, the first resource is a resource set used to transmit sidelink information, and the sidelink information includes the sidelink control information and the sidelink data, the first resource includes at least one time unit in time domain and at least one subchannel in frequency domain, the time unit includes at least one symbol, and the subchannel includes at least one resource block, and the first indication information is further used to obtain a first correspondence satisfied by a time-domain resource and a frequency-domain resource of a resource that is in the first resource and that is used to transmit the sidelink control information. The first communications device receives first control information from the network device, where the first control information indicates a second resource, the second resource belongs to the first resource, the second resource includes the third resource and the fourth resource, and the third resource satisfies the first correspondence. Therefore, the first communications device obtains the first resource, and obtains the third resource and the fourth resource on the second resource of the first resource based on the first correspondence, so as to flexibly configure time-domain resources and frequency-domain resources used to transmit the sidelink control information and the sidelink data.

In a possible design, the first correspondence belongs to a first relationship table, the first indication information includes the first relationship table or the first relationship table is a predefined relationship table, and the first relationship table includes at least one correspondence between a quantity of symbols occupied by the third resource in time domain and a quantity of resource blocks occupied by the third resource in frequency domain. In this way, the first correspondence may be determined in a plurality of correspondences in the first relationship table, thereby further improving flexibility of configuring the resource for sidelink control information transmission.

In a possible design, the quantity of the resource blocks occupied by the third resource in frequency domain is the same as a quantity of resource blocks included in the subchannel, and the third resource is located on a subchannel with a smallest sequence number in at least one subchannel occupied by the second resource in frequency domain. Because the quantity of the resource blocks occupied by the third resource in frequency domain is the same as the quantity of the resource blocks included in the subchannel, compatibility of sidelink control information configuration is improved.

In a possible design, the first indication information includes at least one of the quantity of the symbols occupied by the third resource in time domain and the quantity of the resource blocks occupied by the third resource in frequency domain. Therefore, the first correspondence may be determined based on the first relationship table and the quantity of the symbols occupied by the third resource in time domain or the quantity of the resource blocks occupied by the third resource in frequency domain. Alternatively, the first correspondence may be determined based on the quantity of the symbols occupied by the third resource in time domain and the quantity of the resource blocks occupied by the third resource in frequency domain. Alternatively, the first correspondence may be determined based on the quantity of the symbols occupied by the third resource in time domain and the quantity of the resource blocks included in the subchannel. Therefore, the third resource is obtained from the second resource.

In a possible design, the first communications device selects a second resource from a fifth resource, where the second resource includes the third resource and the fourth resource, the fifth resource is a predefined resource set used to transmit sidelink information, and the sidelink information includes the sidelink control information and the sidelink data, the fifth resource includes at least one time unit in time domain and at least one subchannel in frequency domain, the time unit includes at least one symbol, and the subchannel includes at least one resource block, and a time-domain resource and a frequency-domain resource of a resource that is in the fifth resource and that is used to transmit the sidelink control information satisfy a predefined first correspondence, and the third resource satisfies the first correspondence. Therefore, the predefined fifth resource can be obtained, and the third resource and the fourth resource can be obtained, based on the predefined first correspondence, on the second resource that is independently selected from the fifth resource, so as to flexibly configure the time-domain resources and the frequency-domain resources used to transmit the sidelink control information and the sidelink data.

In a possible design, the third resource includes m control channel elements, m is an integer greater than or equal to 1, and the control channel element includes at least one symbol in time domain and at least one resource block or subcarrier in frequency domain.

In a possible design, the first indication information further indicates at least one of the quantity m of the control channel elements, a quantity of symbols included in the control channel element in time domain, and a quantity of resource blocks or subcarriers included in the control channel element in frequency domain, or at least one of the quantity m of the control channel elements, a quantity of symbols included in the control channel element in time domain, and a quantity of resource blocks or subcarriers included in the control channel element in frequency domain may be predefined. Therefore, the quantity m of the control channel elements included in the third resource, the quantity of the symbols included in the control channel element in time domain, and the quantity of the resource blocks or the subcarriers included in the control channel element in frequency domain may be determined.

In a possible design, the m control channel elements included in the third resource are mapped, in a time-domain-first or frequency-domain-first manner, to the subchannel with the smallest sequence number included in the second resource. The sidelink control information is arranged in the time-domain-first manner, that is, in ascending order of time-domain symbols, to fully occupy a symbol and then occupy a next symbol, to arrange the control channel element included in the sidelink information. Alternatively, the sidelink control information is arranged in the frequency-domain-first manner, that is, in ascending order of frequency-domain resource sequence numbers, to fully occupy a resource block and then occupy a next resource block, to arrange the control channel element included in the sidelink information. Therefore, flexibility of configuring the sidelink control information can be further improved.

According to a third aspect, a sidelink information transmission method is provided. The method may be performed by a second communications device or a chip of a second communications device, and includes The second communications device receives, on a third resource, sidelink control information from a first communications device, where the third resource includes at least one symbol in time domain and at least one resource block in frequency domain. The second communications device receives, on a fourth resource, sidelink data from the first communications device based on the sidelink control information, where the fourth resource includes at least one symbol in time domain and at least one resource block in frequency domain.

Therefore, the second communications device respectively receives the sidelink control information and the sidelink data from the first communications device on the third resource and the fourth resource that are flexibly configured.

In a possible design, the second communications device receives first indication information from a network device, where the first indication information indicates a first resource, the first resource is a resource set used to transmit sidelink information, and the sidelink information includes the sidelink control information and the sidelink data, the first resource includes at least one time unit in time domain and at least one subchannel in frequency domain, the time unit includes at least one symbol, and the subchannel includes at least one resource block, and the first indication information is further used to obtain a first correspondence satisfied by a time-domain resource and a frequency-domain resource of a resource that is in the first resource and that is used to transmit the sidelink control information.

In a possible design, the first correspondence belongs to a first relationship table, the first indication information includes the first relationship table or the first relationship table is a predefined relationship table, and the first relationship table includes at least one correspondence between a quantity of symbols occupied by the resource used to transmit the sidelink control information and a quantity of resource blocks occupied by the resource used to transmit the sidelink control information in frequency domain. In this way, the first correspondence may be determined in a plurality of correspondences in the first relationship table, thereby further improving flexibility of configuring the resource for sidelink control information transmission.

In a possible design, the quantity of the resource blocks occupied by the resource used to transmit the sidelink control information in frequency domain is the same as a quantity of resource blocks included in the subchannel, and the resource used to transmit the sidelink control information is located on a subchannel with a smallest sequence number in at least one subchannel occupied by the second resource in frequency domain. Because the quantity of the resource blocks occupied by the resource used to transmit the sidelink control information in frequency domain is the same as the quantity of the resource blocks included in the subchannel, compatibility of sidelink control information configuration is improved.

In a possible design, the first indication information includes at least one of the quantity of the symbols occupied by the resource used to transmit the sidelink control information in time domain and the quantity of the resource blocks occupied by the resource used to transmit the sidelink control information in frequency domain. Therefore, the first correspondence may be determined based on the first relationship table and the quantity of the symbols occupied by the resource used to transmit the sidelink control information in time domain or the quantity of the resource blocks occupied by the resource used to transmit the sidelink control information in frequency domain. Alternatively, the first correspondence may be determined based on the quantity of the symbols occupied by the resource used to transmit the sidelink control information in time domain and the quantity of the resource blocks occupied by the resource used to transmit the sidelink control information in frequency domain. Alternatively, the first correspondence may be determined based on the quantity of the symbols occupied by the resource used to transmit the sidelink control information in time domain and the quantity of the resource blocks included in the subchannel.

In a possible design, the second communications device obtains a fifth resource, where the fifth resource is a predefined resource set used to transmit sidelink information, and the sidelink information includes the sidelink control information and the sidelink data, the fifth resource includes at least one time unit in time domain and at least one subchannel in frequency domain, the time unit includes at least one symbol, and the subchannel includes at least one resource block, and a time-domain resource and a frequency-domain resource of a resource that is in the fifth resource and that is used to transmit the sidelink control information satisfy a predefined first correspondence, and the resource used to transmit the sidelink control information satisfies the first correspondence. Therefore, the predefined fifth resource can be obtained.

In a possible design, the resource used to transmit the sidelink control information includes m control channel elements, m is an integer greater than or equal to 1, and the control channel element includes at least one symbol in time domain and at least one resource block or subcarrier in frequency domain.

In a possible design, the first indication information further indicates at least one of the quantity m of the control channel elements, a quantity of symbols included in the control channel element in time domain, and a quantity of resource blocks or subcarriers included in the control channel element in frequency domain, or at least one of the quantity m of the control channel elements, a quantity of symbols included in the control channel element in time domain, and a quantity of resource blocks or subcarriers included in the control channel element in frequency domain may be predefined. Therefore, the quantity m of the control channel elements included in the resource used to transmit the sidelink control information, the quantity of the symbols included in the control channel element in time domain, and the quantity of the resource blocks or the subcarriers included in the control channel element in frequency domain may be determined.

In a possible design, the m control channel elements included in the third resource are mapped, in a time-domain-first or frequency-domain-first manner, to the subchannel with the smallest sequence number. The sidelink control information is arranged in the time-domain-first manner, that is, in ascending order of time-domain symbols, to fully occupy a symbol and then occupy a next symbol, to arrange the control channel element included in the sidelink information. Alternatively, the sidelink control information is arranged in the frequency-domain-first manner, that is, in ascending order of frequency-domain resource sequence numbers, to fully occupy a resource block and then occupy a next resource block, to arrange the control channel element included in the sidelink information. Therefore, flexibility of configuring the sidelink control information can be further improved.

According to a fourth aspect, a network device is provided. The network device includes a sending unit, configured to send first indication information to a first communications device, where the first indication information indicates a first resource, the first resource is a resource set used to transmit sidelink information, and the sidelink information includes sidelink control information and sidelink data, the first resource includes at least one time unit in time domain and at least one subchannel in frequency domain, the time unit includes at least one symbol, and the subchannel includes at least one resource block, and the first indication information is further used to obtain a first correspondence satisfied by a time-domain resource and a frequency-domain resource of a resource that is in the first resource and that is used to transmit the sidelink control information. The sending unit is further configured to send first control information to the first communications device, where the first control information indicates a second resource, the second resource belongs to the first resource, and the second resource includes a third resource and a fourth resource, the third resource is used by the first communications device to send the sidelink control information to a second communications device, the third resource includes at least one symbol in time domain and at least one resource block in frequency domain, and the third resource satisfies the first correspondence, and the fourth resource is used by the first communications device to send the sidelink data to the second communications device based on the sidelink control information.

According to this embodiment of this application, the network device configures the first resource for the first communications device, and flexibly configures the third resource and the fourth resource on the second resource of the first resource based on the first correspondence, so as to flexibly configure time-domain resources and frequency-domain resources used to transmit the sidelink control information and the sidelink data.

In a possible design, the first correspondence belongs to a first relationship table, the first indication information includes the first relationship table or the first relationship table is a predefined relationship table, and the first relationship table includes at least one correspondence between a quantity of symbols occupied by the third resource in time domain and a quantity of resource blocks occupied by the third resource in frequency domain. In this way, the first correspondence may be determined in a plurality of correspondences in the first relationship table, thereby further improving flexibility of configuring the resource for sidelink control information transmission.

In a possible design, the quantity of the resource blocks occupied by the third resource in frequency domain is the same as a quantity of resource blocks included in the subchannel, and the third resource is located on a subchannel with a smallest sequence number in at least one subchannel occupied by the second resource in frequency domain. Because the quantity of the resource blocks occupied by the third resource in frequency domain is the same as the quantity of the resource blocks included in the subchannel, compatibility of sidelink control information configuration is improved.

In a possible design, the first indication information includes at least one of the quantity of the symbols occupied by the third resource in time domain and the quantity of the resource blocks occupied by the third resource in frequency domain. Therefore, the first correspondence may be determined based on the first relationship table and the quantity of the symbols occupied by the third resource in time domain or the quantity of the resource blocks occupied by the third resource in frequency domain. Alternatively, the first correspondence may be determined based on the quantity of the symbols occupied by the third resource in time domain and the quantity of the resource blocks occupied by the third resource in frequency domain. Alternatively, the first correspondence may be determined based on the quantity of the symbols occupied by the third resource in time domain and the quantity of the resource blocks included in the subchannel. Therefore, the third resource is configured in the second resource.

In a possible design, the third resource includes m control channel elements, m is an integer greater than or equal to 1, and the control channel element includes at least one symbol in time domain and at least one resource block or subcarrier in frequency domain. Therefore, the third resource may include the control channel elements.

In a possible design, the first indication information further indicates at least one of the quantity m of the control channel elements included in the third resource, a quantity of symbols included in the control channel element in time domain, and a quantity of resource blocks or subcarriers included in the control channel element in frequency domain, or at least one of the quantity m of the control channel elements included in the third resource, a quantity of symbols included in the control channel element in time domain, and a quantity of resource blocks or subcarriers included in the control channel element in frequency domain is predefined information. Therefore, the quantity m of the control channel elements included in the third resource, the quantity of the symbols included in the control channel element in time domain, and the quantity of the resource blocks or the subcarriers included in the control channel element in frequency domain may be determined.

In a possible design, the m control channel elements included in the third resource are mapped, in a time-domain-first or frequency-domain-first manner, to the subchannel with the smallest sequence number included in the second resource. The sidelink control information is arranged in the time-domain-first manner, that is, in ascending order of time-domain symbols, to fully occupy a symbol and then occupy a next symbol, to arrange the control channel element included in the sidelink information. Alternatively, the sidelink control information is arranged in the frequency-domain-first manner, that is, in ascending order of frequency-domain resource sequence numbers, to fully occupy a resource block and then occupy a next resource block, to arrange the control channel element included in the sidelink information. Therefore, flexibility of configuring the sidelink control information can be further improved.

According to a fifth aspect, a first communications device is provided. The first communications device includes a sending unit, configured to send, on a third resource, sidelink control information to a second communications device, where the third resource includes at least one symbol in time domain and at least one resource block in frequency domain. The sending unit is further configured to send, on a fourth resource, sidelink data to the second communications device based on the sidelink control information, where the fourth resource includes at least one symbol in time domain and at least one resource block in frequency domain.

According to this embodiment of this application, the first communications device respectively sends the sidelink control information and the sidelink data to the second communications device on the third resource and the fourth resource that are flexibly configured.

In a possible design, the first communications device further includes a receiving unit. The receiving unit is configured to receive first indication information from a network device, where the first indication information indicates a first resource, the first resource is a resource set used to transmit sidelink information, and the sidelink information includes the sidelink control information and the sidelink data, the first resource includes at least one time unit in time domain and at least one subchannel in frequency domain, the time unit includes at least one symbol, and the subchannel includes at least one resource block, and the first indication information is further used to obtain a first correspondence satisfied by a time-domain resource and a frequency-domain resource of a resource that is in the first resource and that is used to transmit the sidelink control information. The receiving unit is further configured to receive first control information from the network device, where the first control information indicates a second resource, the second resource belongs to the first resource, the second resource includes the third resource and the fourth resource, and the third resource satisfies the first correspondence. Therefore, the first communications device obtains the first resource, and obtains the third resource and the fourth resource on the second resource of the first resource based on the first correspondence, so as to flexibly configure time-domain resources and frequency-domain resources used to transmit the sidelink control information and the sidelink data.

In a possible design, the first correspondence belongs to a first relationship table, the first indication information includes the first relationship table or the first relationship table is a predefined relationship table, and the first relationship table includes at least one correspondence between a quantity of symbols occupied by the third resource in time domain and a quantity of resource blocks occupied by the third resource in frequency domain. In this way, the first correspondence may be determined in a plurality of correspondences in the first relationship table, thereby further improving flexibility of configuring the resource for sidelink control information transmission.

In a possible design, the quantity of the resource blocks occupied by the third resource in frequency domain is the same as a quantity of resource blocks included in the subchannel, and the third resource is located on a subchannel with a smallest sequence number in at least one subchannel occupied by the second resource in frequency domain. Because the quantity of the resource blocks occupied by the third resource in frequency domain is the same as the quantity of the resource blocks included in the subchannel, compatibility of sidelink control information configuration is improved.

In a possible design, the first indication information includes at least one of the quantity of the symbols occupied by the third resource in time domain and the quantity of the resource blocks occupied by the third resource in frequency domain. Therefore, the first correspondence may be determined based on the first relationship table and the quantity of the symbols occupied by the third resource in time domain or the quantity of the resource blocks occupied by the third resource in frequency domain. Alternatively, the first correspondence may be determined based on the quantity of the symbols occupied by the third resource in time domain and the quantity of the resource blocks occupied by the third resource in frequency domain. Alternatively, the first correspondence may be determined based on the quantity of the symbols occupied by the third resource in time domain and the quantity of the resource blocks included in the subchannel. Therefore, the third resource is obtained from the second resource.

In a possible design, the first communications device further includes a processing unit. The processing unit is configured to select a second resource from a fifth resource, where the second resource includes the third resource and the fourth resource, the fifth resource is a predefined resource set used to transmit sidelink information, and the sidelink information includes the sidelink control information and the sidelink data, the fifth resource includes at least one time unit in time domain and at least one subchannel in frequency domain, the time unit includes at least one symbol, and the subchannel includes at least one resource block, and a time-domain resource and a frequency-domain resource of a resource that is in the fifth resource and that is used to transmit the sidelink control information satisfy a predefined first correspondence, and the third resource satisfies the first correspondence. Therefore, the predefined fifth resource can be obtained, and the third resource and the fourth resource can be obtained, based on the predefined first correspondence, on the second resource that is independently selected from the fifth resource, so as to flexibly configure the time-domain resources and the frequency-domain resources used to transmit the sidelink control information and the sidelink data.

In a possible design, the third resource includes m control channel elements, m is an integer greater than or equal to 1, and the control channel element includes at least one symbol in time domain and at least one resource block or subcarrier in frequency domain.

In a possible design, the first indication information further indicates at least one of the quantity m of the control channel elements, a quantity of symbols included in the control channel element in time domain, and a quantity of resource blocks or subcarriers included in the control channel element in frequency domain, or at least one of the quantity m of the control channel elements, a quantity of symbols included in the control channel element in time domain, and a quantity of resource blocks or subcarriers included in the control channel element in frequency domain may be predefined. Therefore, the quantity m of the control channel elements included in the third resource, the quantity of the symbols included in the control channel element in time domain, and the quantity of the resource blocks or the subcarriers included in the control channel element in frequency domain may be determined.

In a possible design, the m control channel elements included in the third resource are mapped, in a time-domain-first or frequency-domain-first manner, to the subchannel with the smallest sequence number included in the second resource. The sidelink control information is arranged in the time-domain-first manner, that is, in ascending order of time-domain symbols, to fully occupy a symbol and then occupy a next symbol, to arrange the control channel element included in the sidelink information. Alternatively, the sidelink control information is arranged in the frequency-domain-first manner, that is, in ascending order of frequency-domain resource sequence numbers, to fully occupy a resource block and then occupy a next resource block, to arrange the control channel element included in the sidelink information. Therefore, flexibility of configuring the sidelink control information can be further improved.

According to a sixth aspect, a second communications device is provided. The second communications device includes a receiving unit, configured to receive, on a third resource, sidelink control information from a first communications device, where the third resource includes at least one symbol in time domain and at least one resource block in frequency domain. The receiving unit is further configured to receive, on a fourth resource, sidelink data from the first communications device based on the sidelink control information, where the fourth resource includes at least one symbol in time domain and at least one resource block in frequency domain.

Therefore, the second communications device respectively receives the sidelink control information and the sidelink data from the first communications device on the third resource and the fourth resource that are flexibly configured.

In a possible design, the receiving unit is further configured to receive first indication information from a network device, where the first indication information indicates a first resource, the first resource is a resource set used to transmit sidelink information, and the sidelink information includes the sidelink control information and the sidelink data, the first resource includes at least one time unit in time domain and at least one subchannel in frequency domain, the time unit includes at least one symbol, and the subchannel includes at least one resource block, and the first indication information is further used to obtain a first correspondence satisfied by a time-domain resource and a frequency-domain resource of a resource that is in the first resource and that is used to transmit the sidelink control information.

In a possible design, the first correspondence belongs to a first relationship table, the first indication information includes the first relationship table or the first relationship table is a predefined relationship table, and the first relationship table includes at least one correspondence between a quantity of symbols occupied by the resource used to transmit the sidelink control information and a quantity of resource blocks occupied by the resource used to transmit the sidelink control information in frequency domain. In this way, the first correspondence may be determined in a plurality of correspondences in the first relationship table, thereby further improving flexibility of configuring the resource for sidelink control information transmission.

In a possible design, the quantity of the resource blocks occupied by the resource used to transmit the sidelink control information in frequency domain is the same as a quantity of resource blocks included in the subchannel, and the resource used to transmit the sidelink control information is located on a subchannel with a smallest sequence number in at least one subchannel occupied by the second resource in frequency domain. Because the quantity of the resource blocks occupied by the resource used to transmit the sidelink control information in frequency domain is the same as the quantity of the resource blocks included in the subchannel, compatibility of sidelink control information configuration is improved.

In a possible design, the first indication information includes at least one of the quantity of the symbols occupied by the resource used to transmit the sidelink control information in time domain and the quantity of the resource blocks occupied by the resource used to transmit the sidelink control information in frequency domain. Therefore, the first correspondence may be determined based on the first relationship table and the quantity of the symbols occupied by the resource used to transmit the sidelink control information in time domain or the quantity of the resource blocks occupied by the resource used to transmit the sidelink control information in frequency domain. Alternatively, the first correspondence may be determined based on the quantity of the symbols occupied by the resource used to transmit the sidelink control information in time domain and the quantity of the resource blocks occupied by the resource used to transmit the sidelink control information in frequency domain. Alternatively, the first correspondence may be determined based on the quantity of the symbols occupied by the resource used to transmit the sidelink control information in time domain and the quantity of the resource blocks included in the subchannel.

In a possible design, the second communications device obtains a fifth resource, where the fifth resource is a predefined resource set used to transmit sidelink information, and the sidelink information includes the sidelink control information and the sidelink data, the fifth resource includes at least one time unit in time domain and at least one subchannel in frequency domain, the time unit includes at least one symbol, and the subchannel includes at least one resource block, and a time-domain resource and a frequency-domain resource of a resource that is in the fifth resource and that is used to transmit the sidelink control information satisfy a predefined first correspondence, and the resource used to transmit the sidelink control information satisfies the first correspondence. Therefore, the predefined fifth resource can be obtained.

In a possible design, the resource used to transmit the sidelink control information includes m control channel elements, m is an integer greater than or equal to 1, and the control channel element includes at least one symbol in time domain and at least one resource block or subcarrier in frequency domain.

In a possible design, the first indication information further indicates at least one of the quantity m of the control channel elements, a quantity of symbols included in the control channel element in time domain, and a quantity of resource blocks or subcarriers included in the control channel element in frequency domain, or at least one of the quantity m of the control channel elements, a quantity of symbols included in the control channel element in time domain, and a quantity of resource blocks or subcarriers included in the control channel element in frequency domain may be predefined. Therefore, the quantity m of the control channel elements included in the resource used to transmit the sidelink control information, the quantity of the symbols included in the control channel element in time domain, and the quantity of the resource blocks or the subcarriers included in the control channel element in frequency domain may be determined.

In a possible design, the m control channel elements included in the third resource are mapped, in a time-domain-first or frequency-domain-first manner, to the subchannel with the smallest sequence number. The sidelink control information is arranged in the time-domain-first manner, that is, in ascending order of time-domain symbols, to fully occupy a symbol and then occupy a next symbol, to arrange the control channel element included in the sidelink information. Alternatively, the sidelink control information is arranged in the frequency-domain-first manner, that is, in ascending order of frequency-domain resource sequence numbers, to fully occupy a resource block and then occupy a next resource block, to arrange the control channel element included in the sidelink information. Therefore, flexibility of configuring the sidelink control information can be further improved.

According to a seventh aspect, a sidelink information transmission method is provided. The method may be performed by a network device or a chip of a network device, and includes The network device sends first indication information to a first communications device, where the first indication information indicates a first resource, and the first resource is a resource set used to transmit sidelink information, the first resource includes at least one time unit in time domain and at least one subchannel in frequency domain, the time unit includes at least one symbol, and the subchannel includes at least one resource block, and the first indication information further indicates at least one of a sixth resource or a seventh resource, the first resource includes the sixth resource and the seventh resource, the sixth resource is a resource set used to transmit sidelink control information, and the seventh resource is a resource set used to transmit sidelink data. The network device sends first control information to the first communications device, where the first control information indicates at least one of a third resource or a fourth resource, the third resource belongs to the sixth resource, the third resource is used by the first communications device to send the sidelink control information to a second communications device, and the third resource includes at least one symbol in time domain and at least one resource block in frequency domain, and the fourth resource belongs to the seventh resource, the fourth resource is used by the first communications device to send the sidelink data to the second communications device based on the sidelink control information, and the fourth resource includes at least one symbol in time domain and at least one resource block in frequency domain.

According to an eighth aspect, a sidelink information transmission method is provided. The method may be performed by a first communications device or a chip of a first communications device, and includes The first communications device sends, on a third resource, sidelink control information to a second communications device, where the third resource includes at least one symbol in time domain and at least one resource block in frequency domain. The first communications device sends, on a fourth resource, sidelink data to the second communications device based on the sidelink control information, where the fourth resource includes at least one symbol in time domain and at least one resource block in frequency domain.

In a possible design, the first communications device receives first indication information from a network device, where the first indication information indicates a first resource, and the first resource is a resource set used to transmit sidelink information, the first resource includes at least one time unit in time domain and at least one subchannel in frequency domain, the time unit includes at least one symbol, and the subchannel includes at least one resource block, and the first indication information further indicates at least one of a sixth resource or a seventh resource, the first resource includes the sixth resource and the seventh resource, the sixth resource is a resource set used to transmit the sidelink control information, and the seventh resource is a resource set used to transmit the sidelink data. The first communications device receives first control information from the network device, where the first control information indicates at least one of the third resource or the fourth resource, the third resource belongs to the sixth resource, the third resource is used by the first communications device to send the sidelink control information to the second communications device, and the third resource includes at least one symbol in time domain and at least one resource block in frequency domain, and the fourth resource belongs to the seventh resource, the fourth resource is used by the first communications device to send the sidelink data to the second communications device based on the sidelink control information, and the fourth resource includes at least one symbol in time domain and at least one resource block in frequency domain.

In a possible design, the first communications device selects the third resource from a sixth resource, and selects the fourth resource from a seventh resource, where the sixth resource and the seventh resource belong to a fifth resource, and the fifth resource is a predefined resource set used to transmit sidelink information. The sixth resource is a predefined resource set used to transmit the sidelink control information, and the seventh resource is a predefined resource set used to transmit the sidelink data. The fifth resource includes at least one time unit in time domain and at least one subchannel in frequency domain, the time unit includes at least one symbol, and the subchannel includes at least one resource block.

According to a ninth aspect, a sidelink information transmission method is provided. The method may be performed by a second communications device or a chip of a second communications device, and includes The second communications device receives, on a third resource, sidelink control information from a first communications device, where the third resource includes at least one symbol in time domain and at least one resource block in frequency domain. The second communications device receives, on a fourth resource, sidelink data from the first communications device based on the sidelink control information, where the fourth resource includes at least one symbol in time domain and at least one resource block in frequency domain.

In a possible design, the second communications device receives first indication information from a network device, where the first indication information indicates a first resource, and the first resource is a resource set used to transmit sidelink information, the first resource includes at least one time unit in time domain and at least one subchannel in frequency domain, the time unit includes at least one symbol, and the subchannel includes at least one resource block, and the first indication information further indicates at least one of a sixth resource or a seventh resource, the first resource includes the sixth resource and the seventh resource, the sixth resource is a resource set used to transmit the sidelink control information, and the seventh resource is a resource set used to transmit the sidelink data.

In a possible design, the second communications device obtains a sixth resource and a seventh resource, where the sixth resource and the seventh resource belong to a fifth resource, and the fifth resource is a predefined resource set used to transmit sidelink information. The sixth resource is a predefined resource set used to transmit the sidelink control information, and the seventh resource is a predefined resource set used to transmit the sidelink data. The fifth resource includes at least one time unit in time domain and at least one subchannel in frequency domain, the time unit includes at least one symbol, and the subchannel includes at least one resource block.

According to a tenth aspect, a network device is provided. The network device includes a sending unit, configured to send first indication information to a first communications device, where the first indication information indicates a first resource, and the first resource is a resource set used to transmit sidelink information, the first resource includes at least one time unit in time domain and at least one subchannel in frequency domain, the time unit includes at least one symbol, and the subchannel includes at least one resource block, and the first indication information further indicates at least one of a sixth resource or a seventh resource, the first resource includes the sixth resource and the seventh resource, the sixth resource is a resource set used to transmit sidelink control information, and the seventh resource is a resource set used to transmit sidelink data. The sending unit is further configured to send first control information to the first communications device, where the first control information indicates at least one of a third resource or a fourth resource, the third resource belongs to the sixth resource, the third resource is used by the first communications device to send the sidelink control information to a second communications device, and the third resource includes at least one symbol in time domain and at least one resource block in frequency domain, and the fourth resource belongs to the seventh resource, the fourth resource is used by the first communications device to send the sidelink data to the second communications device based on the sidelink control information, and the fourth resource includes at least one symbol in time domain and at least one resource block in frequency domain.

According to an eleventh aspect, a first communications device is provided. The first communications device includes a sending unit, configured to send, on a third resource, sidelink control information to a second communications device, where the third resource includes at least one symbol in time domain and at least one resource block in frequency domain. The sending unit is further configured to send, on a fourth resource, sidelink data to the second communications device based on the sidelink control information, where the fourth resource includes at least one symbol in time domain and at least one resource block in frequency domain.

In a possible design, the first communications device further includes a receiving unit. The receiving unit is configured to receive first indication information from a network device, where the first indication information indicates a first resource, and the first resource is a resource set used to transmit sidelink information, the first resource includes at least one time unit in time domain and at least one subchannel in frequency domain, the time unit includes at least one symbol, and the subchannel includes at least one resource block, and the first indication information further indicates at least one of a sixth resource or a seventh resource, the first resource includes the sixth resource and the seventh resource, the sixth resource is a resource set used to transmit the sidelink control information, and the seventh resource is a resource set used to transmit the sidelink data. The receiving unit is further configured to receive first control information from the network device, where the first control information indicates at least one of the third resource or the fourth resource, the third resource belongs to the sixth resource, the third resource is used by the first communications device to send the sidelink control information to the second communications device, and the third resource includes at least one symbol in time domain and at least one resource block in frequency domain, and the fourth resource belongs to the seventh resource, the fourth resource is used by the first communications device to send the sidelink data to the second communications device based on the sidelink control information, and the fourth resource includes at least one symbol in time domain and at least one resource block in frequency domain.

In a possible design, the first communications device further includes a processing unit. The processing unit is configured to select the third resource from a sixth resource, and selects the fourth resource from a seventh resource, where the sixth resource and the seventh resource belong to a fifth resource, and the fifth resource is a predefined resource set used to transmit sidelink information. The sixth resource is a predefined resource set used to transmit the sidelink control information, and the seventh resource is a predefined resource set used to transmit the sidelink data. The fifth resource includes at least one time unit in time domain and at least one subchannel in frequency domain, the time unit includes at least one symbol, and the subchannel includes at least one resource block.

According to a twelfth aspect, a second communications device is provided. The second communications device includes a receiving unit, configured to receive, on a third resource, sidelink control information from a first communications device, where the third resource includes at least one symbol in time domain and at least one resource block in frequency domain. The receiving unit is further configured to receive, on a fourth resource, sidelink data from the first communications device based on the sidelink control information, where the fourth resource includes at least one symbol in time domain and at least one resource block in frequency domain.

In a possible design, the receiving unit is further configured to receive first indication information from a network device, where the first indication information indicates a first resource, and the first resource is a resource set used to transmit sidelink information, the first resource includes at least one time unit in time domain and at least one subchannel in frequency domain, the time unit includes at least one symbol, and the subchannel includes at least one resource block, and the first indication information further indicates at least one of a sixth resource or a seventh resource, the first resource includes the sixth resource and the seventh resource, the sixth resource is a resource set used to transmit the sidelink control information, and the seventh resource is a resource set used to transmit the sidelink data.

In a possible design, the second communications device obtains a sixth resource and a seventh resource, where the sixth resource and the seventh resource belong to a fifth resource, and the fifth resource is a predefined resource set used to transmit sidelink information. The sixth resource is a predefined resource set used to transmit the sidelink control information, and the seventh resource is a predefined resource set used to transmit the sidelink data. The fifth resource includes at least one time unit in time domain and at least one subchannel in frequency domain, the time unit includes at least one symbol, and the subchannel includes at least one resource block.

According to a thirteenth aspect, an embodiment of this application provides a chip, configured to perform a method according to the foregoing aspects. The chip may include a part having functions of a memory, a processor, a transmitter, a receiver, and/or a transceiver, and the memory stores an instruction, code, and/or data, to perform a method according to the foregoing aspects.

According to a fourteenth aspect, an embodiment of this application provides a computer-readable storage medium. The computer-readable storage medium stores an instruction, and when the instruction is run on a computer, the computer is enabled to perform the method according to any one of the foregoing aspects.

According to a fifteenth aspect, an embodiment of this application provides a computer program product. The program product stores a computer software instruction used by the first communications device or the second communications device, and the computer software instruction includes a program used to perform the solutions according to the foregoing aspects.

According to a sixteenth aspect, an embodiment of this application provides a system. The system includes the first communications device and the second communications device according to the foregoing aspects. The system may further include a network device.

DETAILED DESCRIPTION OF ILLUSTRATIVE EMBODIMENTS

Figure 1:
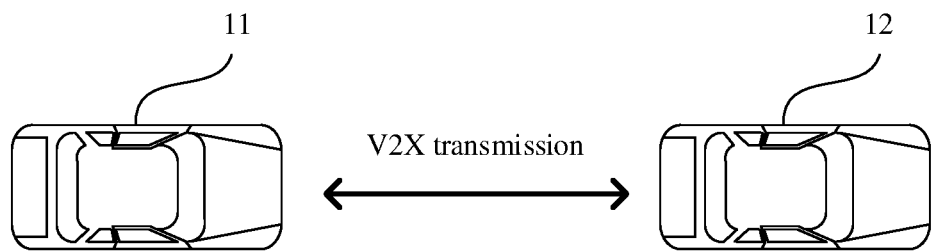
FIG. 1 is a schematic architectural diagram of a system according to an embodiment of this application.

FIG. 1 is a schematic architectural diagram of a possible V2X communications system according to an embodiment of the present invention. As shown in FIG. 1, the V2X communications system includes a first communications device 11 and a second communications device 12. Sidelink information transmitted in V2X includes sidelink control information and sidelink data transmitted by the first communications device 11 and the second communications device 12. When the first communications device 11 and the second communications device 12 are within coverage of a network device, a resource used for sidelink information transmission may be configured by the network device. When the first communications device 11 and the second communications device 12 are not within the coverage of the network device, the resource used for sidelink information transmission may be independently selected by the first communications device 11.

There may be one or more "second communications devices" in this application. If there are a plurality of second communications devices, the first communications device 11 performs sidelink information transmission with the plurality of second communications devices. For ease of description, one second communications device is used as an example for description in the present invention. However, a quantity of second communications devices included in the present invention includes but is not limited to this.

The network device in this application is an apparatus that is deployed in a radio access network and that is configured to provide a wireless communication function for the first communications device and the second communications device. The network device may be a base station (BS), for example, a macro base station, a micro base station, a relay station, or an access point, or may be a device in another form, for example, a street lamp or a road side unit (RSU). In systems using different radio access technologies, a device having a network device function may be termed differently. For example, in a 5th generation (5G) network, the device is a network device or a base station, in a long term evolution (LTE) network, the device is referred to as an evolved NodeB (eNB or eNodeB), in a third generation (3G) network, the device is referred to as a NodeB, or the like. Or the device is an RSU in V2X communication, or a chip or a system on chip (SOC) in the network device or the base station. For ease of description, in this application, the foregoing apparatus that provides the wireless communication function for the first communications device and the second communications device is collectively referred to as the network device.

The first communications device and the second communications device in this application may include various devices having the wireless communication function or units, components, apparatuses, chips, or SOCs in the devices. The device having the wireless communication function may be, for example, a vehicle-mounted device, a wearable device, a computing device or another device connected to a wireless modem, a mobile station (MS), a terminal, or user equipment (UE).

All or a part of this application may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedures or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The following describes the embodiments of this application in more detail with reference to specific examples by using the first communications device and the second communications device as an example.

Figure 2:
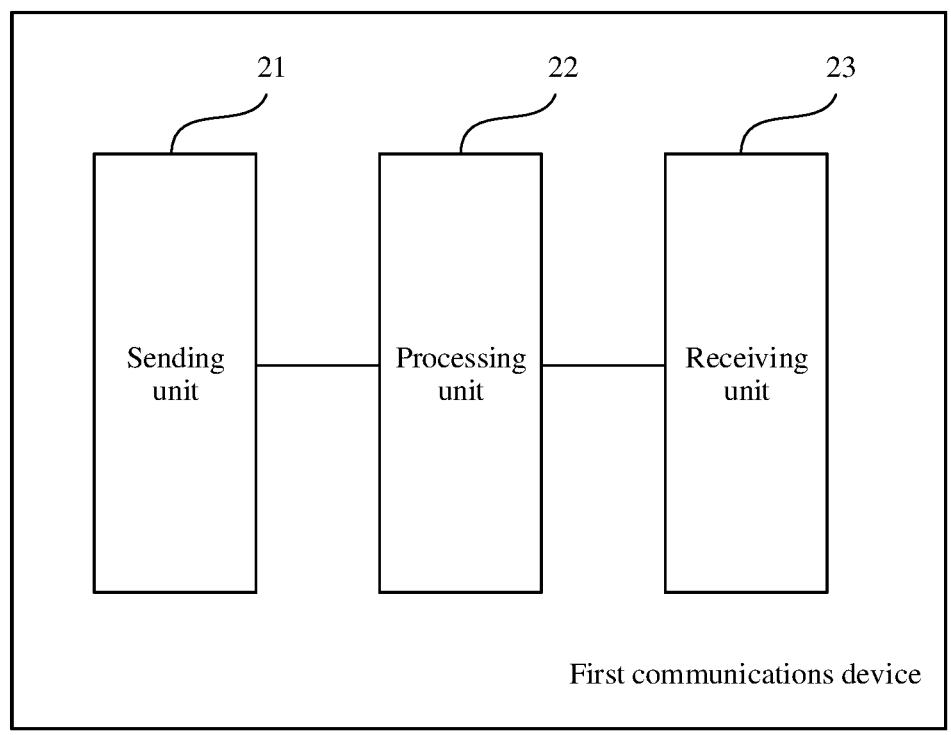
FIG. 2 shows a first communications device according to an embodiment of this application.
Figure 3:
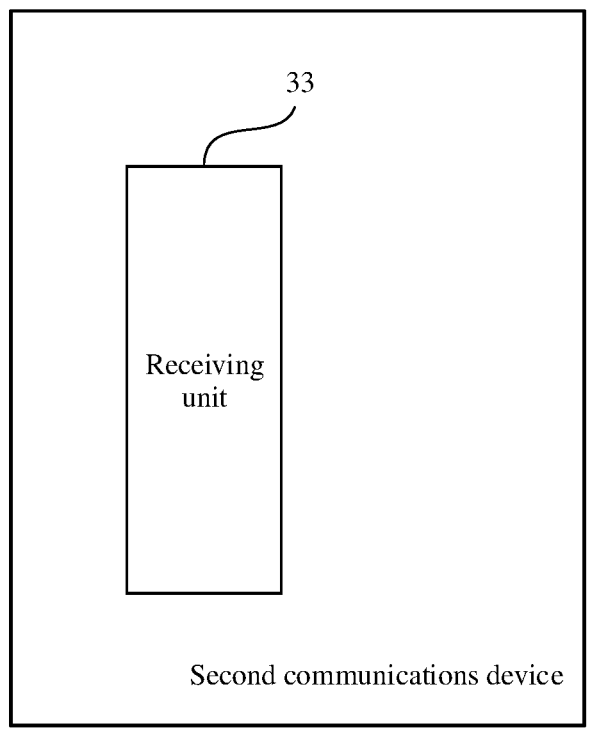
FIG. 3 shows a second communications device according to an embodiment of this application.
Figure 4:
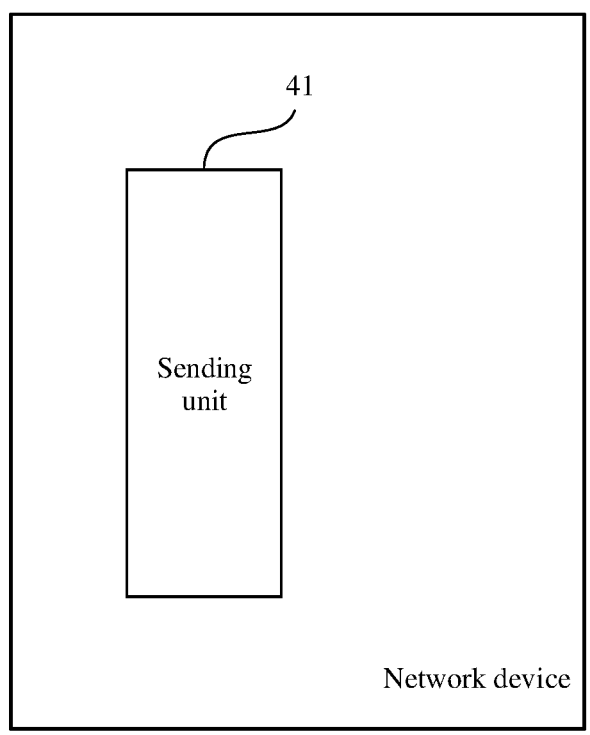
FIG. 4 shows a network device according to an embodiment of this application.
Figure 5:
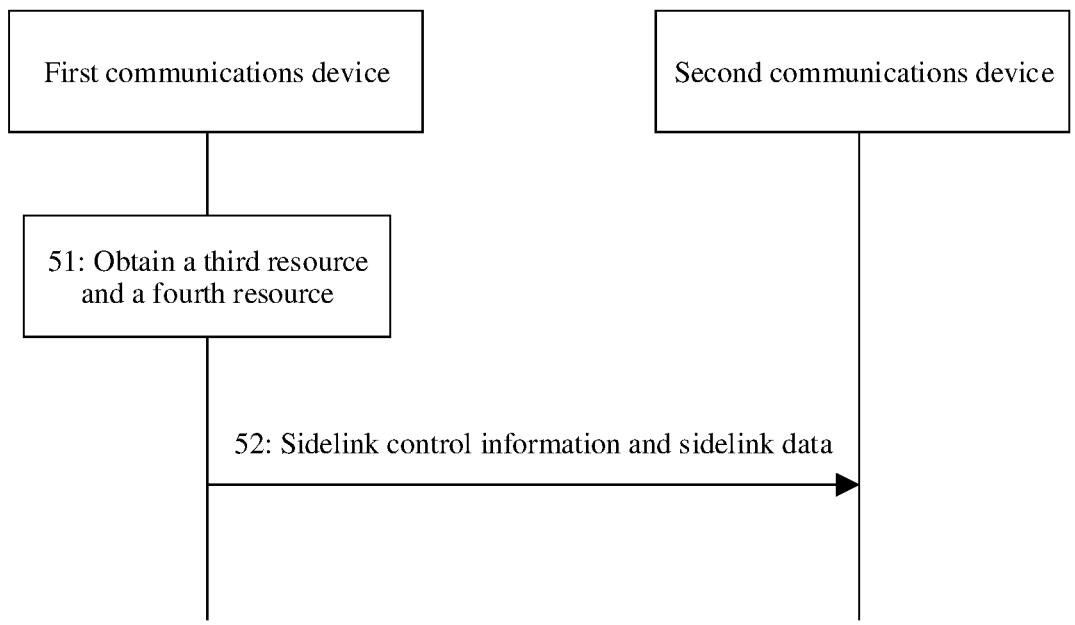
FIG. 5 shows a method for transmitting sidelink control information and sidelink data, a first communications device, a second communications device, and a system according to an embodiment of this application.

FIG. 5 shows a method for transmitting sidelink information, a first communications device, a second communications device, a network device, and a system according to an embodiment of this application. As shown in FIG. 2, a first communications device includes a sending unit 21, a processing unit 22, and a receiving unit 23. The sending unit 21 and the receiving unit 23 may be replaced with a transceiver unit. As shown in FIG. 3, a second communications device includes a receiving unit 33, and may further include a sending unit 31 and a processing unit 32. The sending unit 31 and the receiving unit 33 may be replaced with a transceiver unit. As shown in FIG. 4, a network device includes a sending unit 41, and may further include a processing unit 42 and a receiving unit 43. The sending unit 41 and the receiving unit 43 may be replaced with a transceiver unit.

When the first communications device and the second communications device are terminal devices or user equipment, and when the network device is a base station, the processing unit 22 to the processing unit 42 may be processors, the sending unit 21 to the sending unit 41 and the receiving unit 23 to the receiving unit 43 may be transceivers, the sending unit 21 to the sending unit 41 may be transmitters, and the receiving unit 23 to the receiving unit 43 may be receivers. The transceiver, the transmitter, or the receiver may be a radio frequency circuit. When the first communications device, the second communications device, or the network device includes a storage unit, the storage unit is configured to store a computer instruction. The processor is in communication connection with the storage unit, and the processor executes the computer instruction stored in the memory, to enable the first communications device, the second communications device, or the network device to perform the method in the embodiment of FIG. 5. The processor may be a general-purpose central processing unit (CPU), a microprocessor, or an application-specific integrated circuit (ASIC).

When the first communications device, the second communications device, or the network device is a chip, the processing unit 22 to the processing unit 42 may be, for example, processors, the sending unit 21 to the sending unit 41 may be output interfaces, pins, circuits, or the like, the receiving unit 23 to the receiving unit 43 may be input interfaces, pins, circuits, or the like, and the transceiver unit may be, for example, an input/output interface, a pin, or a circuit. The processing unit may execute a computer-executable instruction stored in a storage unit, so that a chip in the first communications device, the second communications device, or the network device performs the method in FIG. 5. Optionally, the storage unit is a storage unit in the chip, for example, a register or a buffer, or the storage unit may be a storage unit in the terminal but outside the chip, for example, a read-only memory (ROM), another type of static storage device capable of storing static information and instructions, or a random access memory (RAM).

Specific steps involved in the embodiment of FIG. 5 are as follows.

Figure 6:
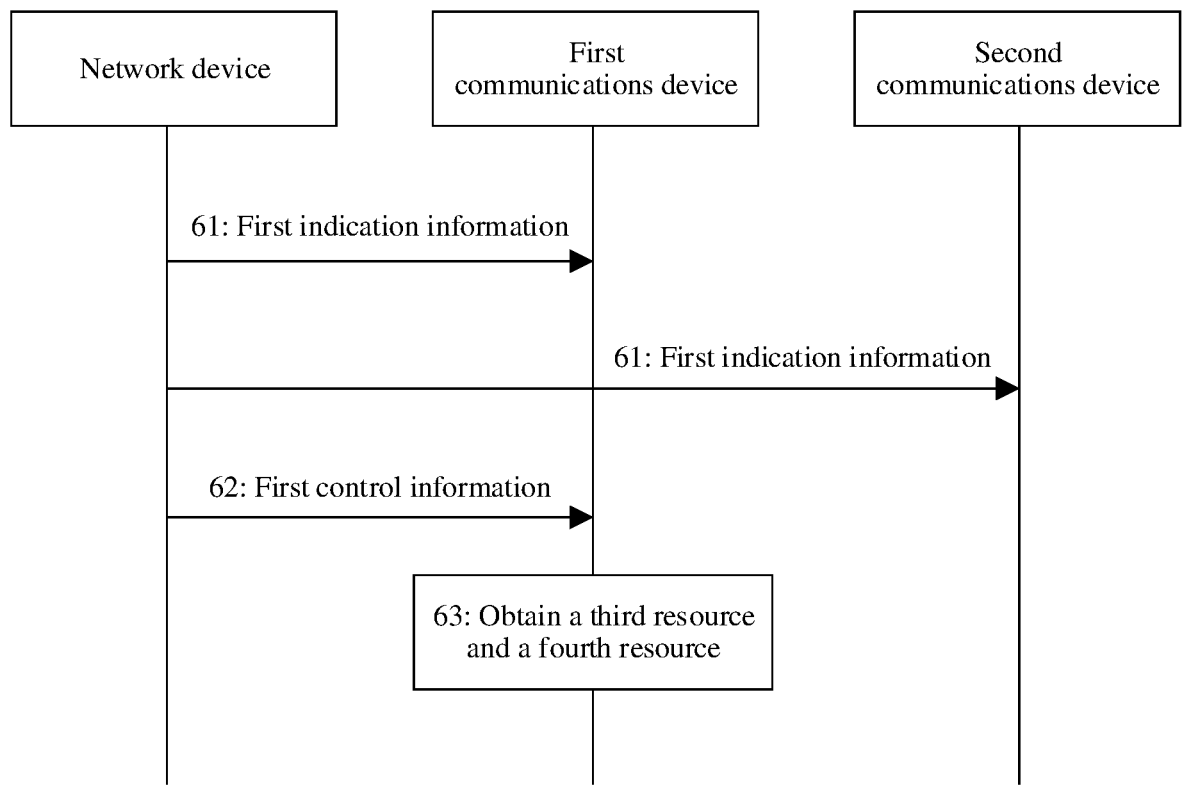
FIG. 6 shows a method for configuring a sidelink information resource, a network device, a first communications device, a second communications device, and a system according to an embodiment of this application.

Step 51: The first communications device obtains a third resource and a fourth resource, and when the first communications device and the second communications device are in network coverage, that is, in communication in a V2X network device scheduling mode, for example, in a mode 3, specific steps of obtaining the third resource and the fourth resource by the first communications device are shown in FIG. 6. Communication in the network device scheduling mode 3 is V2X communication that is based on scheduling by a base station, and a resource used by the first communications device to send control information and data to another communications device is allocated by the base station.

In step 61 in FIG. 6, the sending unit 41 of the network device sends first indication information to the first communications device, and the receiving unit 23 of the first communications device receives the first indication information from the network device, where the first indication information indicates a first resource, the first resource is a resource set used to transmit sidelink information, and the sidelink information includes sidelink control information and sidelink data, the first resource includes at least one time unit in time domain and at least one subchannel in frequency domain, the time unit includes at least one symbol, and the subchannel includes at least one resource block, and the first indication information is further used to obtain a first correspondence satisfied by a time-domain resource and a frequency-domain resource of a resource that is in the first resource and that is used to transmit the sidelink control information. The sending unit 41 of the network device may further send the first indication information to the second communications device. In this embodiment, the first communications device and the second communications device are used as an example. Actually, the sending unit of the network device may further send the first indication information to another communications device other than the first communications device and the second communications device. The first indication information may be radio resource control (RRC) signaling, the first resource may be a resource pool that is configured by the network device and that is used for sidelink communication, and the resource pool for sidelink communication may be a set of a time resource and a frequency resource for sidelink communication. The first resource includes at least one time unit in time domain, and the time unit may be a mini-slot, a slot, and a subframe. The first indication information indicates both the first resource and a quantity of resource blocks included in the subchannel.

In step 62 in FIG. 6, the sending unit 41 of the network device sends first control information to the first communications device, and the receiving unit 23 of the first communications device receives the first control information from the network device, where the first control information indicates a second resource, the second resource belongs to the first resource, and the second resource includes the third resource and the fourth resource. The third resource is used by the first communications device to send the sidelink control information to the second communications device, the third resource includes at least one symbol in time domain and at least one resource block in frequency domain, and the third resource satisfies the first correspondence. The fourth resource is used by the first communications device to send the sidelink data to the second communications device based on the sidelink control information. The first control information may be downlink control signaling (DCI), and the first communications device selects, from the first resource, that is, a sidelink communication resource pool, based on the first control information, the second resource used to send the sidelink information to the second communications device, determine the third resource in the second resource based on the first correspondence, and determine the fourth resource in the second resource based on a size of the third resource.

In step 61, the first correspondence satisfied by the time-domain resource and the frequency-domain resource of the third resource may belong to a first relationship table. The first indication information may further include the first relationship table or the first relationship table is a predefined relationship table, and the first relationship table includes at least one correspondence between a quantity of symbols occupied by the third resource in time domain and a quantity of resource blocks occupied by the third resource in frequency domain. For example, a first time unit is a slot. The first relationship table may be shown in Table 1 or Table 2. Table 1 or Table 2 may be included in the first indication information or may be predefined, and a predefining method may be pre-stipulated in a protocol or configured before device delivery. Table 1 provides at least one correspondence between a range of a bandwidth occupied by the third resource in frequency domain and the quantity of the symbols occupied by the third resource in time domain. Table 2 provides at least one correspondence between a range of the quantity of the symbols occupied by the third resource in time domain and the bandwidth occupied by the third resource in frequency domain. Table 1 and Table 2 merely provide possible correspondence manners between the quantity of the symbols of the third resource in time domain and the bandwidth occupied by the third resource in frequency domain, and actual application is not limited thereto.

TABLE 1

| Third resource bandwidth W (RB) | Quantity T of the symbols occupied by the third resource |
| --- | --- |
| W ≥ 16 | 2 |
| 8 ≤ W < 16 | 3 |

TABLE 1-continued

| Third resource bandwidth W (RB) | Quantity T of the symbols occupied by the third resource |
| --- | --- |
| 6 ≤ W < 8 | 4 |
| 4 ≤ W < 6 | 5 |
| W < 4 | 6 |

TABLE 2

| Quantity T of the symbols occupied by the third resource | Third resource bandwidth W (RB) |
| --- | --- |
| 10 < T ≤ 13 | 2 |
| 6 < T ≤ 10 | 3 |
| 4 < T ≤ 6 | 4 |
| 3 < T ≤ 4 | 6 |
| T = 3 | 8 |
| T = 2 | 12 |

The quantity of the resource blocks occupied by the third resource in frequency domain may be the same as the quantity of the resource blocks included in the subchannel, and the third resource is located on a subchannel with a smallest sequence number in at least one subchannel occupied by the second resource in frequency domain. The first indication information indicates both the first resource and the quantity of the resource blocks included in the subchannel. Therefore, when it is predefined that the quantity of the resource blocks occupied by the third resource in frequency domain is the same as the quantity of the resource blocks included in the subchannel, the processing unit 22 of the first communications device may directly obtain the quantity of the resource blocks occupied by the third resource in frequency domain. When the first relationship table is shown in Table 1, the processing unit 22 of the first communications device determines, based on the quantity of the resource blocks occupied by the third resource in frequency domain and Table 1, the quantity of the symbols occupied by the third resource in time domain, so as to obtain the first correspondence. For example, when the quantity of the resource blocks included in the subchannel is 8, the processing unit 22 of the first communications device may directly learn that the quantity of the resource blocks occupied by the third resource in frequency domain is also 8. When the first relationship table is shown in Table 1, the processing unit 22 of the first communications device may determine, based on Table 1 and that the quantity of the resource blocks occupied by the third resource in frequency domain is 8, that the quantity of the symbols occupied by the third resource in time domain is 3. Therefore, the first correspondence is that the quantity of the symbols occupied in time domain is 3 and the quantity of the resource blocks occupied in frequency domain is 8.

The first indication information may further include at least one of the quantity of the symbols occupied by the third resource in time domain and the quantity of the resource blocks occupied by the third resource in frequency domain. When the first relationship table is shown in Table 1, the first indication information may include the quantity of the resource blocks occupied by the third resource in frequency domain. For example, when the quantity of the resource blocks occupied by the third resource in frequency domain is 6, the first communications device may determine, based on Table 1, that the quantity of the symbols occupied by the third resource in time domain is 4, so that the first correspondence is that the quantity of the symbols occupied in time domain is 4 and the quantity of the resource blocks occupied in frequency domain is 6. When the first relationship table is shown in Table 2, the first indication information may include the quantity of the symbols occupied by the third resource in time domain. For example, when the quantity of the symbols occupied by the third resource in time domain is 7, the first communications device may determine, based on Table 2, that the quantity of the resource blocks occupied by the third resource in frequency domain is 3, so that the first correspondence is that the quantity of the symbols occupied in time domain is 7 and the quantity of the resource blocks occupied in frequency domain is 3. Alternatively, when the quantity of the resource blocks occupied by the third resource in frequency domain is the same as the quantity of the resource blocks included in the subchannel, the first indication information includes the quantity of the symbols occupied by the third resource in time domain, and the first communications device may obtain, by obtaining the quantity of the resource blocks included in the subchannel, the quantity of the resource blocks occupied by the third resource in frequency domain. For example, when the quantity of the resource blocks included in the subchannel is 8, and the quantity of the symbols occupied by the third resource in time domain is 3, the first correspondence is that the quantity of the symbols occupied in time domain is 3 and the quantity of the resource blocks occupied in frequency domain is 8. Alternatively, the first indication information directly indicates the first correspondence, the first indication information may include the quantity of the symbols occupied by the third resource in time domain and the quantity of the resource blocks occupied by the third resource in frequency domain, and the first communications device may directly obtain the first correspondence. For example, the first correspondence may be that the quantity of the symbols occupied in time domain is 4 and the quantity of the resource blocks occupied in frequency domain is 6.

Figure 7:
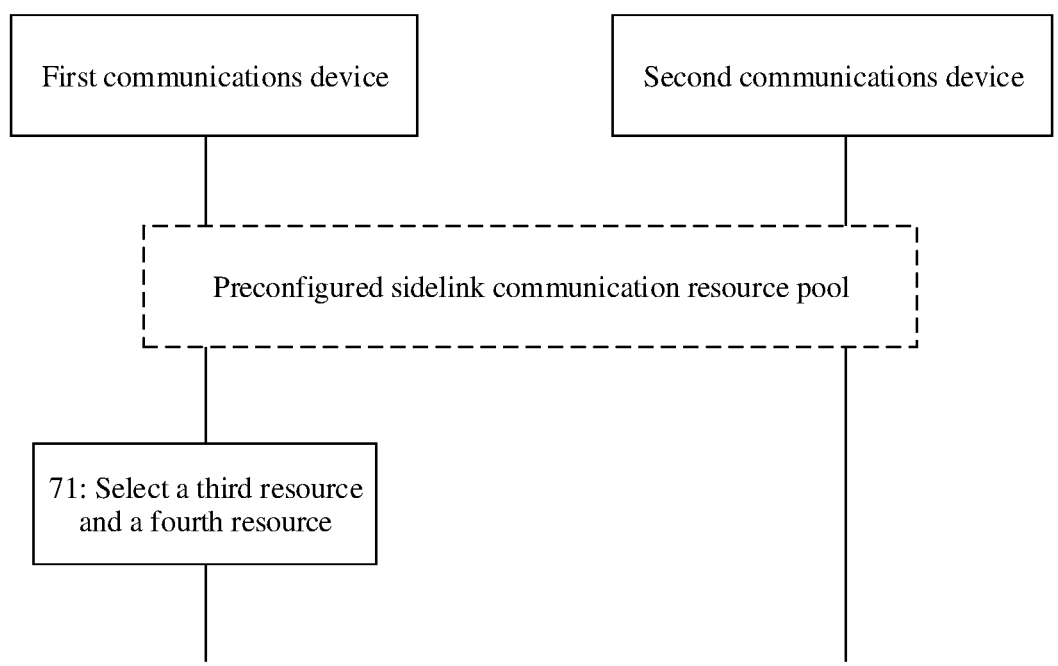
FIG. 7 shows a method for configuring a sidelink information resource, a first communications device, a second communications device, and a system according to an embodiment of this application.

Step 51: The first communications device obtains a third resource and a fourth resource, and when the first communications device and the second communications device are outside network coverage, that is, in communication in a V2X user-selected mode, for example, in a mode 4, specific steps of obtaining the third resource and the fourth resource by the first communications device are shown in FIG. 7. Communication in the user-selected mode is V2X communication in which a communications device independently selects a resource used to transmit control information and data. The first communications device selects the third resource and the fourth resource from a resource pool, and notifies, through the sidelink control information, another communications device of the third resource and the fourth resource that are selected by the first communications device.

In step 71, the processing unit 22 of the first communications device selects a second resource from a fifth resource, where the second resource includes the third resource and the fourth resource, the fifth resource is a predefined resource set used to transmit sidelink information, and the sidelink information includes the sidelink control information and the sidelink data, the fifth resource includes at least one time unit in time domain and at least one subchannel in frequency domain, the time unit includes at least one symbol, and the subchannel includes at least one resource block, and a time-domain resource and a frequency-domain resource of a resource that is in the fifth resource and that is used to transmit the sidelink control information satisfy a predefined first correspondence, and the third resource satisfies the first correspondence. The fifth resource may be a predefined sidelink communication resource pool, and the first communications device independently selects the second resource from the fifth resource. The time unit may be a slot, a mini-slot, or a subframe. The first communications device selects the third resource from the second resource based on the predefined first correspondence, and determines the fourth resource in the second resource based on a size of the third resource.

Figure 8:
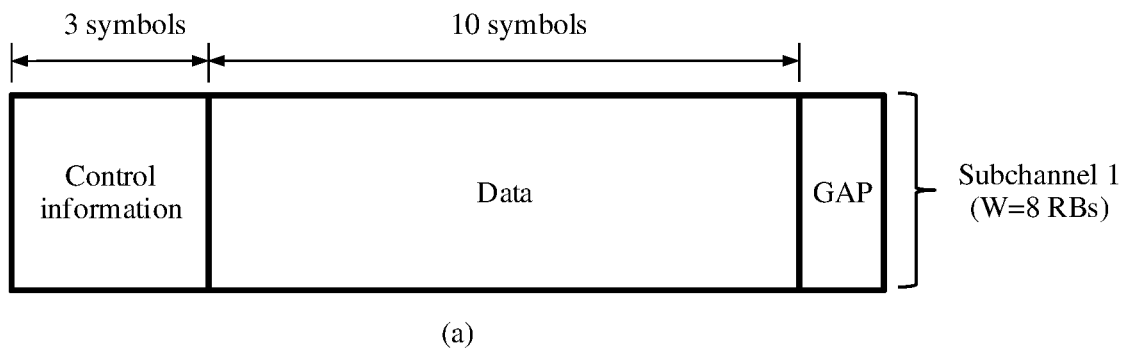
FIG. 8 is a schematic diagram of a resource configuration according to an embodiment of this application.
Figure 8:
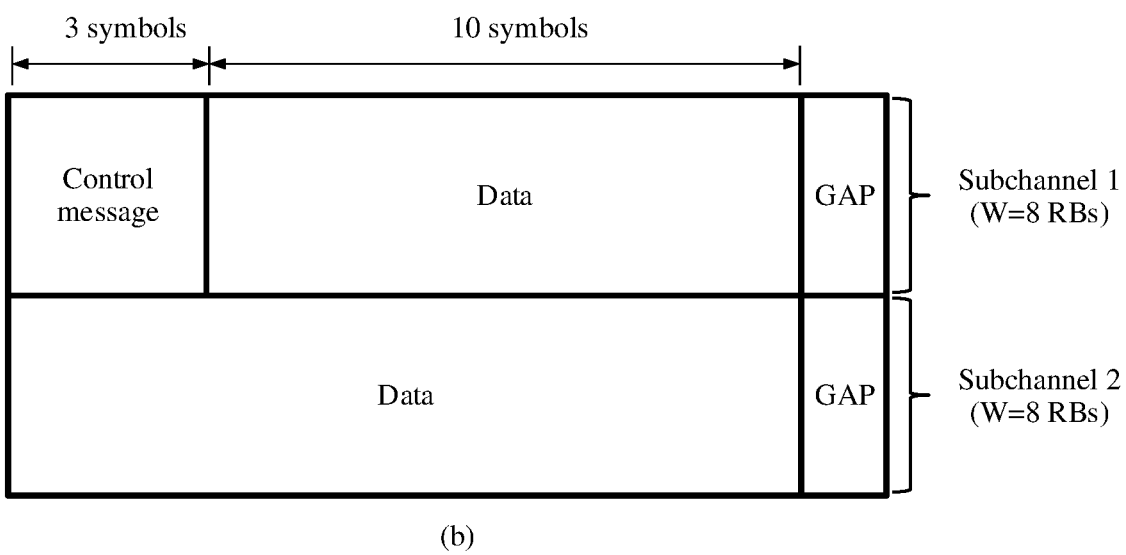

As shown in FIG. 8, one slot is used as an example. One slot may include 14 symbols, and the last symbol in the slot is used for a guard interval. A quantity of symbols actually used to transmit the control information and the data is 13. FIG. 8 shows only an example of symbol usage in the slot, and there may be another usage case. For example, the first symbol is used for automatic gain control (AGC), the last symbol is used for a guard interval, and a quantity of symbols actually used to transmit the control information and the data is 12. FIG. 8(a) is a possible schematic diagram of resource mapping between control information and data, that is, a possible configuration of the third resource and the fourth resource. The first correspondence is that the quantity of the symbols occupied in time domain is 3 and the quantity of the resource blocks occupied in frequency domain is 8. The second resource occupies one slot in time domain and occupies one subchannel in frequency domain, and a bandwidth of the subchannel is eight resource blocks. In this case, the third resource occupies three symbols in time domain and occupies eight resource blocks in frequency domain, and the fourth resource occupies 10 symbols in time domain and occupies eight resource blocks in frequency domain. FIG. 8(b) is another possible schematic diagram of resource mapping between control information and data, that is, a possible configuration of the third resource and the fourth resource. The first correspondence is that the quantity of the symbols occupied in time domain is 3 and the quantity of the resource blocks occupied in frequency domain is 8. The second resource occupies one slot in time domain and occupies two subchannels in frequency domain, and a bandwidth of the subchannel is eight resource blocks. In this case, the third resource occupies three symbols in time domain and occupies eight resource blocks in frequency domain, and is located on a subchannel with a relatively small sequence number. The fourth resource occupies two subchannels. The fourth resource occupies 10 symbols in time domain and occupies one subchannel in frequency domain, and occupies 13 symbols in time domain and occupies one subchannel in frequency domain.

The third resource may include m control channel elements, m is an integer greater than or equal to 1, and the control channel element includes at least one symbol in time domain and at least one resource block or subcarrier in frequency domain. The first indication information may further indicate at least one of the quantity m of the control channel elements included in the third resource, a quantity of symbols included in the control channel element in time domain, and a quantity of resource blocks or subcarriers included in the control channel element in frequency domain, or at least one of the quantity m of the control channel elements included in the third resource, a quantity of symbols included in the control channel element in time domain, and a quantity of resource blocks or subcarriers included in the control channel element in frequency domain is predefined information. The m control channel elements included in the third resource are mapped, in a time-domain-first or frequency-domain-first manner, to a subchannel with a smallest sequence number included in the second resource.

The control channel element may be a control channel element for sending a V2X control message (V2X CCE). The V2X CCE occupies one or more symbols in time domain, and occupies one or more subcarriers or resource blocks in frequency domain. For example, a size of the V2X CCE may be that the V2X CCE occupies one symbol in time domain and occupies two resource blocks in frequency domain. The size of the V2X CCE may be indicated by the first indication information, or may be directly predefined, and the quantity m of V2X CCEs may also be indicated by the first indication information or directly predefined. The first communications device determines the third resource, based on the size of the V2X CCE and the quantity m in the time-domain-first or frequency-domain-first manner, on the subchannel with the smallest sequence number included in the second resource.

Figure 9:
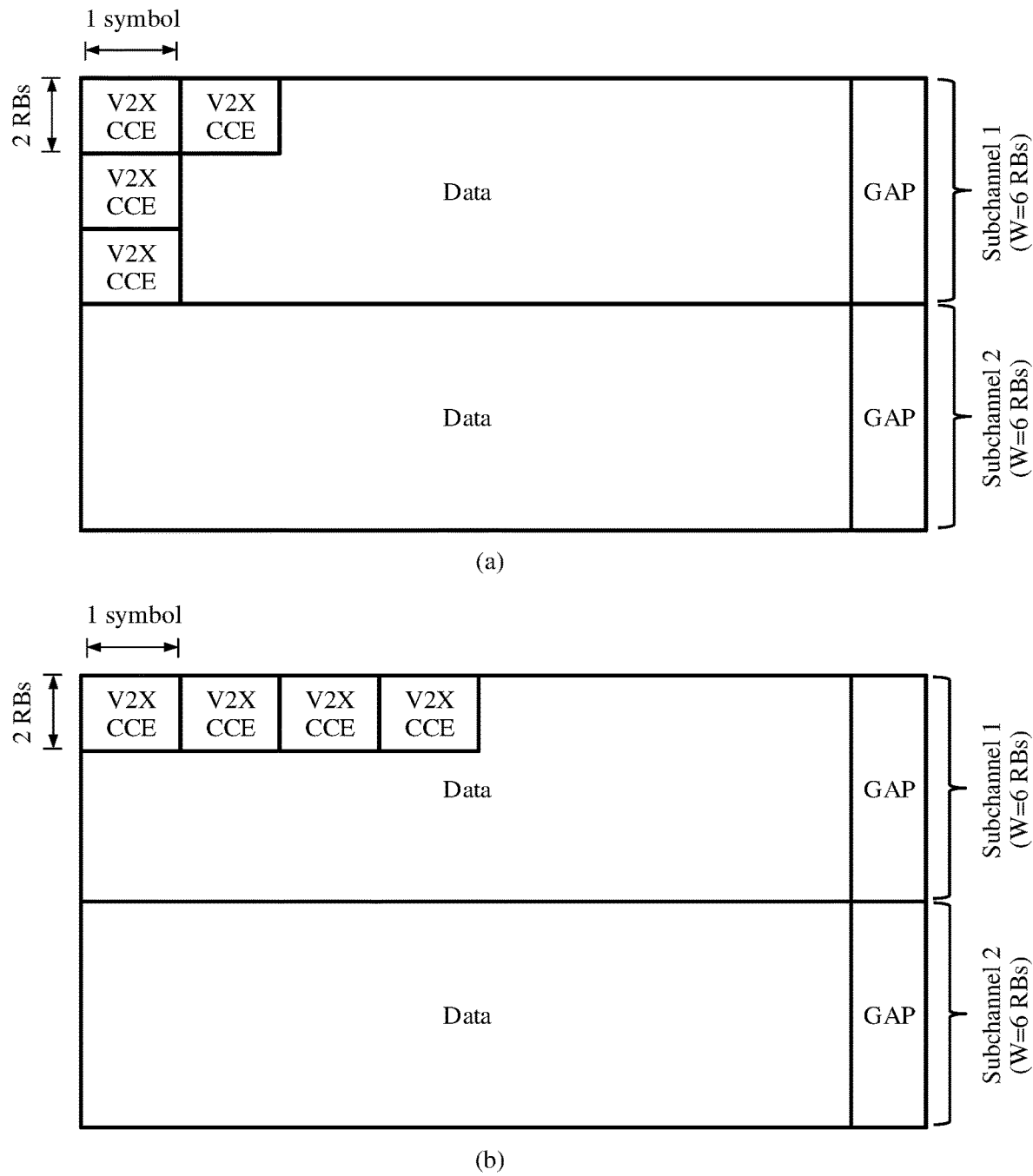
FIG. 9 is a schematic diagram of a resource configuration according to an embodiment of this application.

As shown in FIG. 9, one slot is used as an example. One slot may include 14 symbols, and the last symbol in the slot is used for a guard interval. A quantity of symbols actually used to transmit the control information and the data is 13. FIG. 9(a) and FIG. 9(b) each provide a possible schematic diagram of resource mapping between control information and data, that is, a possible configuration of the third resource and the fourth resource. The quantity m of the V2X CCEs is 4, the V2X CCE occupies one symbol in time domain and occupies two resource blocks in frequency domain, a bandwidth of the subchannel is six resource blocks, and the second resource occupies one slot in time domain and occupies two subchannels in frequency domain. FIG. 9(a) and FIG. 9(b) respectively show a resource mapping status of four V2X CCEs in the frequency-domain-first manner and time-domain-first manner, and the V2X CCE is located on the subchannel with the smallest sequence number. In FIG. 9(a), the four V2X CCEs are arranged in ascending order of frequency-domain resource block symbols, and after the first symbol is fully occupied by six resource blocks, resource blocks corresponding to a next symbol are arranged. In FIG. 9(b), the four V2X CCEs are arranged in ascending order of time-domain symbols. The four V2X CCEs form the third resource, and the fourth resource is a part, other than the third resource, of the second resource.

Step 52: The sending unit 21 of the first communications device sends, on the third resource, the sidelink control information to the second communications device, and the sending unit 21 of the first communications device sends, on the fourth resource, the sidelink data to the second communications device based on the sidelink control information. The receiving unit 33 of the second communications device receives, on the third resource, the sidelink control information from the first communications device, and the receiving unit 33 of the second communications device receives, on the fourth resource, the sidelink data from the first communications device based on the sidelink control information.

The sending unit 41 of the network device sends the first indication information to the first communications device, and the receiving unit 23 of the first communications device receives the first indication information from the network device, where the first indication information indicates the first resource, and the first resource is a resource set used to transmit the sidelink information. The first resource includes at least one time unit in time domain and at least one subchannel in frequency domain, the time unit includes at least one symbol, and the subchannel includes at least one resource block. The first indication information further indicates at least one of a sixth resource or a seventh resource, the first resource includes the sixth resource and the seventh resource, the sixth resource is a resource set used to transmit the sidelink control information, and the seventh resource is a resource set used to transmit the sidelink data. The sending unit 41 of the network device may further send the first indication information to the second communications device. In this embodiment, the first communications device and the second communications device are used as an example. Actually, the sending unit of the network device may further send the first indication information to another communications device other than the first communications device and the second communications device. The first indication information may be radio resource control (RRC) signaling, the first resource may be a resource pool that is configured by the network device and that is used for sidelink communication, and the resource pool for sidelink communication may be a set of a time resource and a frequency resource for sidelink communication. The first resource includes at least one time unit in time domain, and the time unit may be a mini-slot, a slot, or a subframe. The first indication information indicates both the first resource and the quantity of the resource blocks included in the subchannel.

The sending unit 41 of the network device sends the first control information to the first communications device, and the receiving unit 23 of the first communications device receives the first control information from the network device, where the first control information indicates at least one of the third resource or the fourth resource. The third resource belongs to the sixth resource, the third resource is used by the first communications device to send the sidelink control information to the second communications device, and the third resource includes at least one symbol in time domain and at least one resource block in frequency domain. The fourth resource belongs to the seventh resource, the fourth resource is used by the first communications device to send the sidelink data to the second communications device based on the sidelink control information, and the fourth resource includes at least one symbol in time domain and at least one resource block in frequency domain. The first control information may be downlink control signaling (Downlink Control Information, DCI), and the first communications device selects, from the first resource, that is, a sidelink communication resource pool, based on the first control information, the third resource used to send the sidelink control information to the second communications device and the fourth resource used to send the sidelink data to the second communications device.

The processing unit 22 of the first communications device may further select the third resource from the sixth resource, and select the fourth resource from the seventh resource. The sixth resource and the seventh resource belong to the fifth resource, and the fifth resource is a predefined resource set used to transmit the sidelink information. The sixth resource is a predefined resource set used to transmit the sidelink control information, and the seventh resource is a predefined resource set used to transmit the sidelink data. The fifth resource includes at least one time unit in time domain and at least one subchannel in frequency domain, the time unit includes at least one symbol, and the subchannel includes at least one resource block. The fifth resource may be a predefined sidelink communication resource pool, and the first communications device independently selects the third resource and the fourth resource from the sixth resource and the seventh resource. The time unit may be a slot, a mini-slot, or a subframe.

Figure 10:
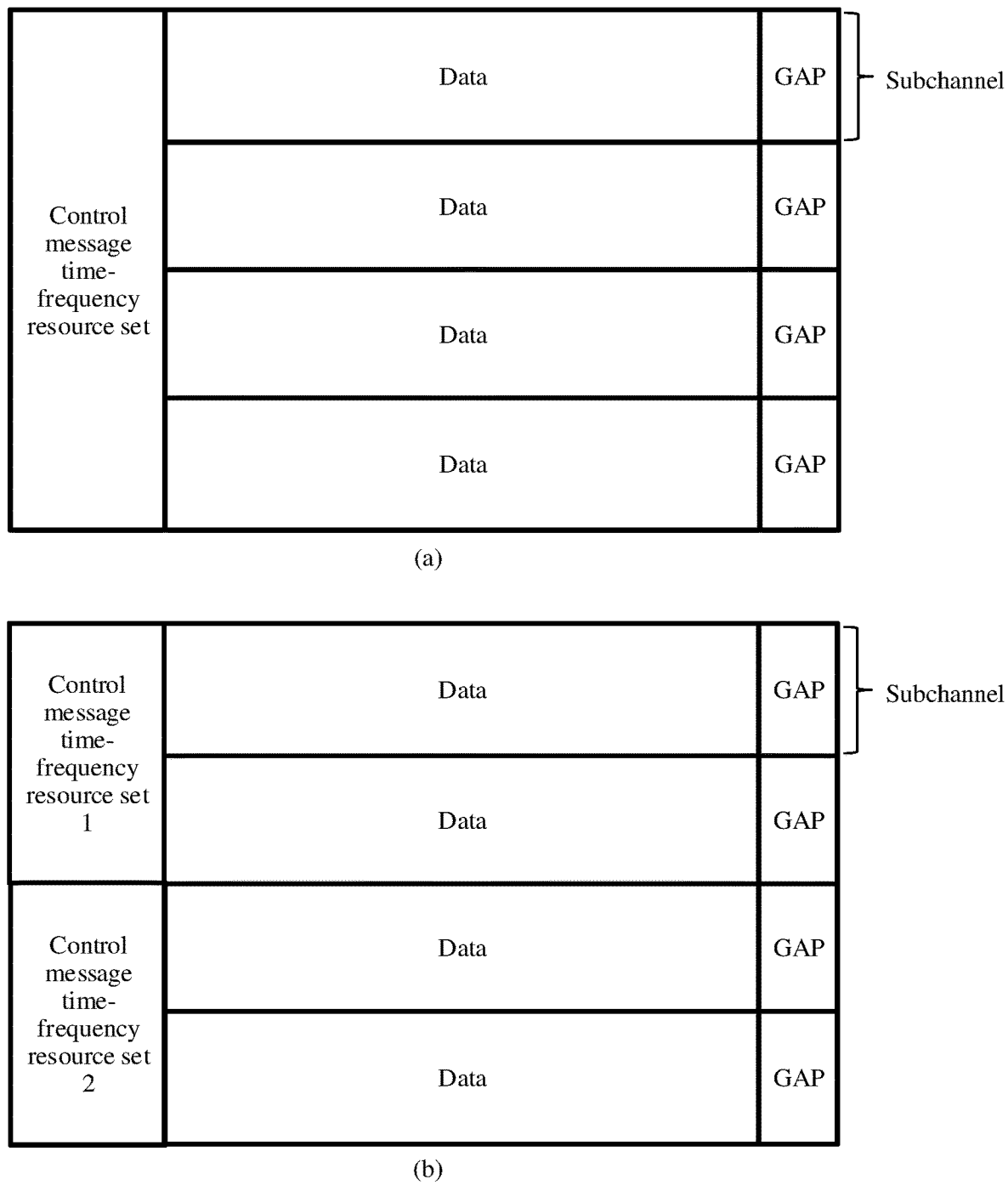
FIG. 10 is a schematic diagram of a resource pool configuration according to an embodiment of this application.

FIG. 10 shows two possible resource pool configuration modes. The sixth resource may be a control message time-frequency resource set. In FIG. 10(a), one control message time-frequency resource set is included, and four subchannels are occupied. In FIG. 10(b), two control message time-frequency resource sets are included, and each control message time-frequency resource set occupies two subchannels.

Figure 11:
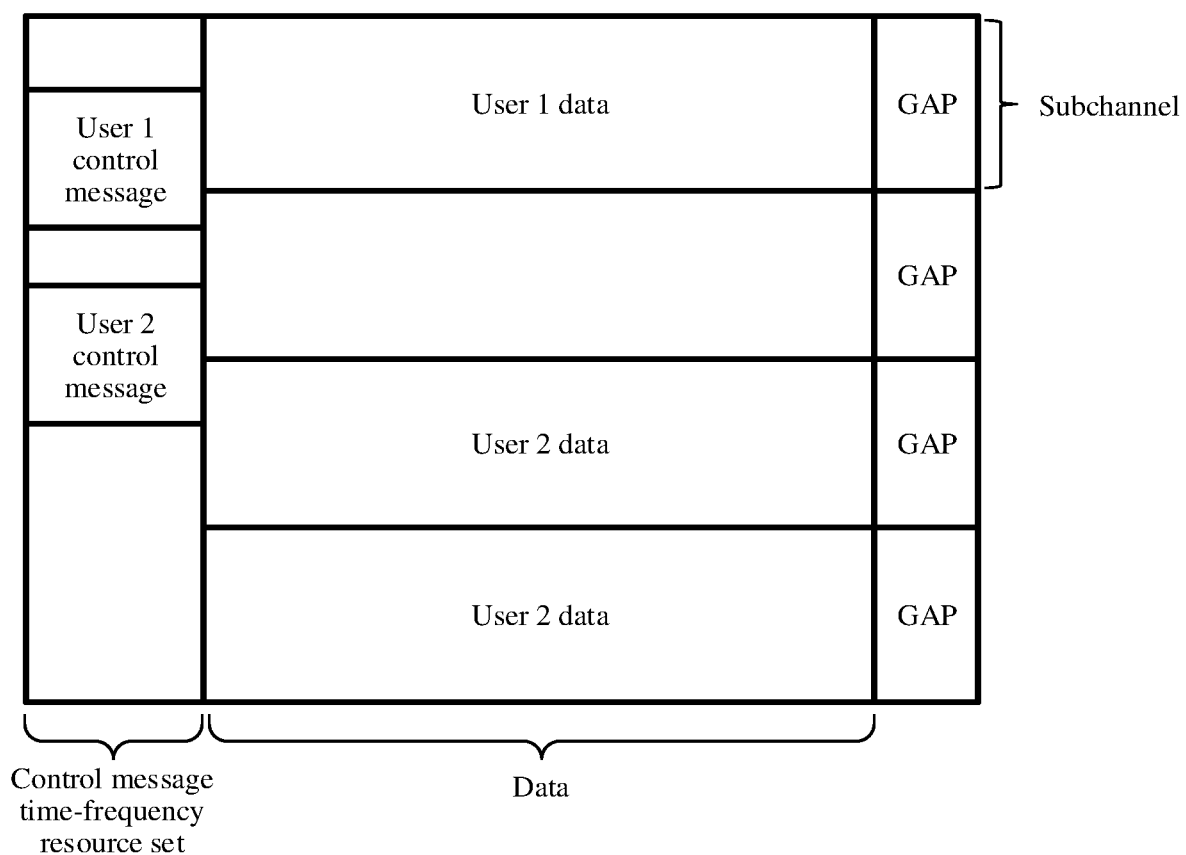
FIG. 11 is a schematic diagram of a resource configuration according to an embodiment of this application.

FIG. 11 is a possible schematic diagram of resource configurations of a user 1 and a user 2. Resources occupied by control messages of the user 1 and the user 2 occupy different resources in the control message time-frequency resource set, data of the user 1 occupies one subchannel, and data of the user 2 occupies two subchannels. The sending unit 21 of the first communications device sends, on the third resource, the sidelink control information to the second communications device, and the sending unit 21 of the first communications device sends, on the fourth resource, the sidelink data to the second communications device based on the sidelink control information. The receiving unit 33 of the second communications device receives, on the third resource, the sidelink control information from the first communications device, and the receiving unit 33 of the second communications device receives, on the fourth resource, the sidelink data from the first communications device based on the sidelink control information.

What is claimed is:

1. A sidelink information transmission method, comprising:
   sending, by a network device, first indication information to a first communications device, wherein the first indication information indicates a first resource, wherein the first resource is a resource set used to transmit sidelink information, wherein the sidelink information comprises sidelink control information and sidelink data, wherein the first resource comprises at least one time unit in a time domain and further comprises at least one subchannel in a frequency domain, wherein the time unit comprises at least one symbol, wherein the subchannel comprises at least one resource block, and wherein the first indication information indicates a time-domain resource and a frequency-domain resource of a resource that is in the first resource and that is used to transmit the sidelink control information; and
   sending, by the network device, first control information to the first communications device, wherein the first control information indicates a second resource, wherein the second resource belongs to the first resource, wherein the second resource comprises a third resource and a fourth resource, wherein the third resource is used by the first communications device to send the sidelink control information to a second communications device, wherein the third resource comprises at least one symbol in the time domain and at least one resource block in the frequency domain, wherein the third resource is indicated by the first indication information, and wherein the fourth resource is used by the first communications device to send the sidelink data to the second communications device based on the sidelink control information.

2. The method according to claim 1, wherein a first correspondence is satisfied by the time-domain resource and the frequency-domain resource of the resource, wherein the first correspondence belongs to a first relationship table, wherein the first relationship table is at least one of disposed in the first indication information or is a predefined relationship table, and wherein the first relationship table comprises at least one correspondence between a quantity of symbols occupied by the third resource in the time domain and a quantity of resource blocks occupied by the third resource in the frequency domain.

3. The method according to claim 1, wherein the first indication information comprises at least one of the quantity of the symbols occupied by the third resource in the time domain or the quantity of the resource blocks occupied by the third resource in the frequency domain.

4. A sidelink information transmission method, comprising:
   receiving, by a first communications device, first indication information from a network device, wherein the first indication information indicates a first resource, wherein the first resource is a resource set used to transmit sidelink information, wherein the sidelink information comprises sidelink control information and sidelink data, wherein the first resource comprises at least one time unit in a time domain and at least one subchannel in a frequency domain, wherein the time unit comprises at least one symbol, wherein the subchannel comprises at least one resource block, and wherein the first indication information indicates a time-domain resource and a frequency-domain resource of a resource that is in the first resource and that is used to transmit the sidelink control information;
   receiving, by the first communications device, first control information from the network device, wherein the first control information indicates a second resource, wherein the second resource belongs to the first resource, wherein the second resource comprises a third resource and a fourth resource, and wherein the third resource is indicated by the first by the first indication information;
   sending, by the first communications device, to a second communications device, on the third resource, the sidelink control information, wherein the third resource comprises at least one symbol in the time domain and at least one resource block in the frequency domain; and
   sending, by the first communications device, to the second communications device, on the fourth resource and based on the sidelink control information, the sidelink data, wherein the fourth resource comprises at least one symbol in the time domain and at least one resource block in the frequency domain.

5. The method according to claim 4, wherein a first correspondence is satisfied by the time-domain resource and the frequency-domain resource of the resource, wherein the first correspondence belongs to a first relationship table, wherein the first relationship table is at least one of disposed in the first indication information or is a predefined relationship table, and wherein the first relationship table comprises at least one correspondence between a quantity of symbols occupied by the third resource in time domain and a quantity of resource blocks occupied by the third resource in frequency domain.

6. The method according to claim 4, wherein the first indication information comprises at least one of a quantity of the symbols occupied by the third resource in the time domain or a quantity of the resource blocks occupied by the third resource in the frequency domain.

7. The method according to claim 4, wherein the method further comprises further comprising:
   selecting, by the first communications device, a second resource from a fifth resource, wherein the second resource comprises the third resource and the fourth resource, wherein the fifth resource is a predefined resource set used to transmit sidelink information, wherein the sidelink information comprises the sidelink control information and the sidelink data, wherein the fifth resource comprises at least one time unit in the time domain and at least one subchannel in the frequency domain, the time unit comprises at least one symbol, wherein the subchannel comprises at least one resource block, wherein a time-domain resource and a frequency-domain resource of a resource that is in the fifth resource and that is used to transmit the sidelink control information satisfy a predefined second correspondence, and wherein the third resource is indicated by the first indication information.

8. The method according to claim 4, wherein the third resource comprises m control channel elements, wherein m is an integer greater than or equal to 1, and wherein the control channel element comprises at least one symbol in the time domain and at least one resource block or subcarrier in the frequency domain.

9. The method according to claim 8, wherein at least one of:
the first indication information further indicates at least one of the quantity m of the control channel elements, a quantity of symbols comprised in the control channel element in time domain, and a quantity of resource blocks or subcarriers comprised in the control channel element in frequency domain; or
at least one of the quantity m of the control channel elements, a quantity of symbols comprised in the control channel element in time domain, and a quantity of resource blocks or subcarriers comprised in the control channel element in frequency domain is predefined.

10. A network device, comprising:
a sending unit;
one or more processors; and
a non-transitory computer readable medium storing a program for execution by the one or more processors, the program having instructions to:
cause the sending unit to send first indication information to a first communications device, wherein the first indication information indicates a first resource, wherein the first resource is a resource set used to transmit sidelink information, wherein the sidelink information comprises sidelink control information and sidelink data, wherein the first resource comprises at least one time unit in a time domain and at least one subchannel in a frequency domain, wherein the time unit comprises at least one symbol, wherein the subchannel comprises at least one resource block, and wherein the first indication information indicates a time-domain resource and a frequency-domain resource of a resource that is in the first resource and that is used to transmit the sidelink control information; and
cause the sending unit to send first control information to the first communications device, wherein the first control information indicates a second resource, wherein the second resource belongs to the first resource, wherein the second resource comprises a third resource and a fourth resource, wherein the third resource is used by the first communications device to send the sidelink control information to a second communications device, wherein the third resource comprises at least one symbol in the time domain and at least one resource block in the frequency domain, wherein the third resource is indicated by the first indication information, and wherein the fourth resource is used by the first communications device to send the sidelink data to the second communications device based on the sidelink control information.

11. The network device according to claim 10, wherein a first correspondence is satisfied by the time-domain resource and the frequency-domain resource of the resource, wherein the first correspondence belongs to a first relationship table, wherein the relationship table is at least one of disposed in the first indication information or is a predefined relationship table, and wherein the first relationship table comprises at least one correspondence between a quantity of symbols occupied by the third resource in the time domain and a quantity of resource blocks occupied by the third resource in the frequency domain.

12. The network device according to claim 10, wherein the first indication information comprises at least one of the quantity of the symbols occupied by the third resource in the time domain or the quantity of the resource blocks occupied by the third resource in the frequency domain.

13. A first communications device, comprising:
a sending unit;
a receiving unit;
one or more processors; and
a non-transitory computer readable medium storing a program for execution by the one or more processors, the program having instructions to:
receive, through the receiving unit, first indication information from a network device, wherein the first indication information indicates a first resource, wherein the first resource is a resource set used to transmit sidelink information, wherein the sidelink information comprises sidelink control information and sidelink data, wherein the first resource comprises at least one time unit in a time domain and at least one subchannel in a frequency domain, wherein the time unit comprises at least one symbol, wherein the subchannel comprises at least one resource block, wherein the first indication information indicates a time-domain resource and a frequency-domain resource of a resource that is in the first resource and that is used to transmit the sidelink control information;
receive, through the receiving unit, first control information from the network device, wherein the first control information indicates a second resource, wherein the second resource belongs to the first resource, wherein the second resource comprises a third resource and a fourth resource, and wherein the third resource is indicated by the first indication information;
cause the sending unit to send, on the third resource, sidelink control information to a second communications device, wherein the third resource comprises at least one symbol in the time domain and at least one resource block in the frequency domain; and
cause the sending unit to send, on the fourth resource, to the second communications device, based on the sidelink control information, sidelink data, wherein the fourth resource comprises at least one symbol in the time domain and at least one resource block in the frequency domain.

14. The first communications device according to claim 13, wherein a first correspondence is satisfied by the time-domain resource and the frequency-domain resource of the resource, wherein the first correspondence belongs to a first relationship table, wherein the first relationship table is at least one of disposed in the first indication information or is a predefined relationship table, and wherein the first relationship table comprises at least one correspondence between a quantity of symbols occupied by the third resource in the time domain and a quantity of resource blocks occupied by the third resource in the frequency domain.

15. The first communications device according to claim 13, wherein the first indication information comprises at least one of the quantity of the symbols occupied by the third resource in the time domain or the quantity of the resource blocks occupied by the third resource in the frequency domain.

16. The first communications device according to claim 13, wherein the program further includes instructions to
select a second resource from a fifth resource, wherein the second resource comprises the third resource and the fourth resource, wherein the fifth resource is a predefined resource set used to transmit sidelink information, wherein the sidelink information comprises the sidelink control information and the sidelink data, wherein the fifth resource comprises at least one time unit in the time domain and at least one subchannel in the frequency domain, wherein the time unit comprises at least one symbol, wherein the subchannel comprises at least one resource block, wherein a time-domain resource and a frequency-domain resource of a resource that is in the fifth resource and that is used to transmit the sidelink control information satisfy a predefined first correspondence, and wherein the third resource is indicated by the first indication information.

17. The first communications device according to claim 13, wherein the third resource comprises m control channel elements, wherein m is an integer greater than or equal to 1, and wherein the control channel element comprises at least one symbol in the time domain and at least one resource block or subcarrier in the frequency domain.

18. The first communications device according to claim 17, wherein at least one of:
the first indication information further indicates at least one of the quantity m of the control channel elements, a quantity of symbols comprised in the control channel element in time domain, and a quantity of resource blocks or subcarriers comprised in the control channel element in frequency domain; or
at least one of the quantity m of the control channel elements, a quantity of symbols comprised in the control channel element in time domain, and a quantity of resource blocks or subcarriers comprised in the control channel element in frequency domain may be predefined.

* * * * *